(12) United States Patent
Inami

(10) Patent No.: US 8,712,478 B2
(45) Date of Patent: Apr. 29, 2014

(54) MOBILE ELECTRONIC DEVICE

(75) Inventor: Akiko Inami, Daito (JP)

(73) Assignee: KYOCERA Corporation, Kyoto (JP)

( * ) Notice: Subject to any disclaimer, the term of this patent is extended or adjusted under 35 U.S.C. 154(b) by 6 days.

(21) Appl. No.: 13/456,726

(22) Filed: Apr. 26, 2012

(65) Prior Publication Data

US 2012/0276958 A1    Nov. 1, 2012

(30) Foreign Application Priority Data

Apr. 26, 2011 (JP) ................................ 2011-098751

(51) Int. Cl.
*H04B 1/38* (2006.01)
*H04M 1/725* (2006.01)

(52) U.S. Cl.
CPC ......... *H04M 1/72583* (2013.01); *H04B 1/3833* (2013.01)
USPC ....... 455/566; 455/90.2; 455/90.3; 455/550.1

(58) Field of Classification Search
CPC .................................................. H04M 1/72583
USPC .............................. 455/566, 90.3, 90.2, 550.1
See application file for complete search history.

(56) References Cited

U.S. PATENT DOCUMENTS

| 5,900,848 | A | * | 5/1999 | Haneda et al. ................. 345/1.1 |
| 7,289,084 | B2 | * | 10/2007 | Lesniak ......................... 345/1.1 |
| 7,433,179 | B2 | * | 10/2008 | Hisano et al. ............. 361/679.27 |
| 8,300,022 | B2 | * | 10/2012 | Brenneman et al. .......... 345/173 |
| 8,451,243 | B2 | * | 5/2013 | Fuyuno et al. ................ 345/173 |
| 2010/0079355 | A1 | * | 4/2010 | Kilpatrick et al. ............. 345/1.3 |
| 2012/0081267 | A1 | * | 4/2012 | Sirpal et al. .................... 345/1.1 |

FOREIGN PATENT DOCUMENTS

JP          93-05262 A     11/1997
JP      2011-036424 A      2/2011

* cited by examiner

*Primary Examiner* — Sanh Phu

(57) ABSTRACT

A device and methods for operating a mobile electronic device are presented. A condition of the mobile electronic device is detected to provide a condition of use. Correspondence relation between inputs detected at a first input detector and a second input detector and the inputs to a first display surface and a second display surface are stored in association with the condition of use. The inputs detected by one of the first input detector and the second input detector are processed as the inputs to one of the first display surface and the second display surface based on the correspondence relation in association with the condition of use.

18 Claims, 26 Drawing Sheets

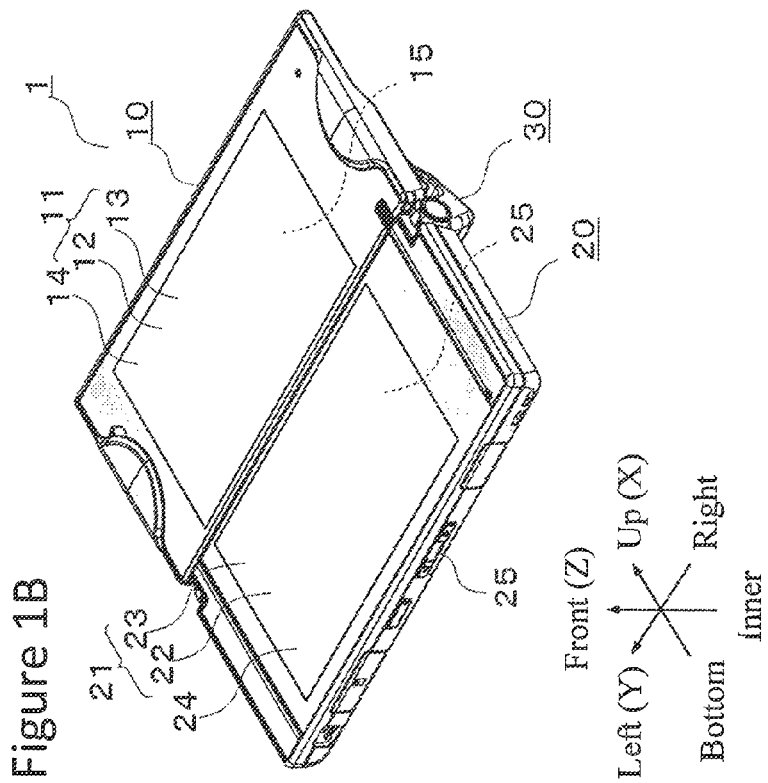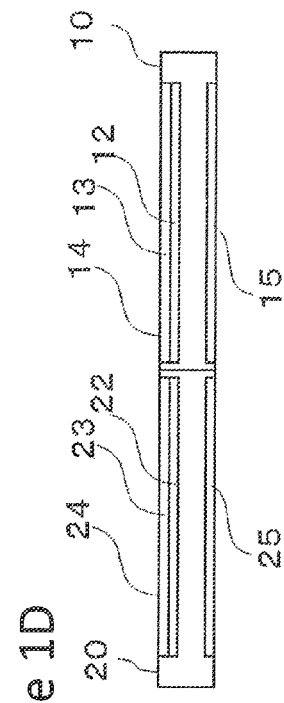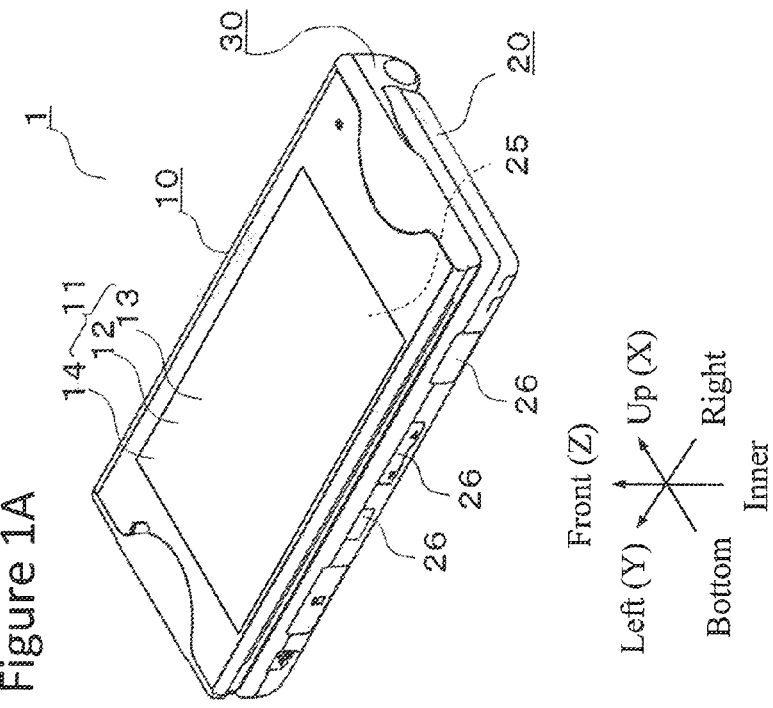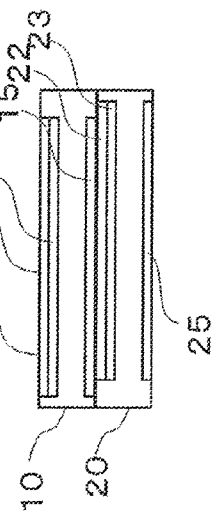

Figure 5

| Aspect / Screen condition | Horizontal (I) | Vertical (II) |
|---|---|---|
| Closed state | 10 | 10 |
| Open state | 10 \| 20 | 10 / 20 |
| Tilted state | 10 / 20 | 10 / 20 |

The condition of use of the mobile phone

Figure 8A

Correspondence defining table

| Screen state | First touch sensor | Second touch sensor | First rear touch sensor | Second rear touch sensor |
|---|---|---|---|---|
| Open state | ○ | × | × | 1 |
| Closed state | ○ | ○ | × | × |
| Tilted state (I) | × | ○ | × | 1 |
| Tilted state (II) | ○ | ○ | × | × |

Figure 8B

Explanation of the correspondence defining table

| Elements | Meaning of the elements |
|---|---|
| ○ | Valid |
| × | Invalid |
| 1 | Input to the first display |

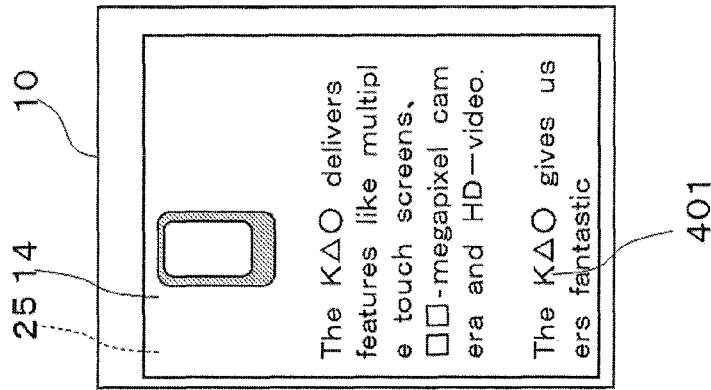
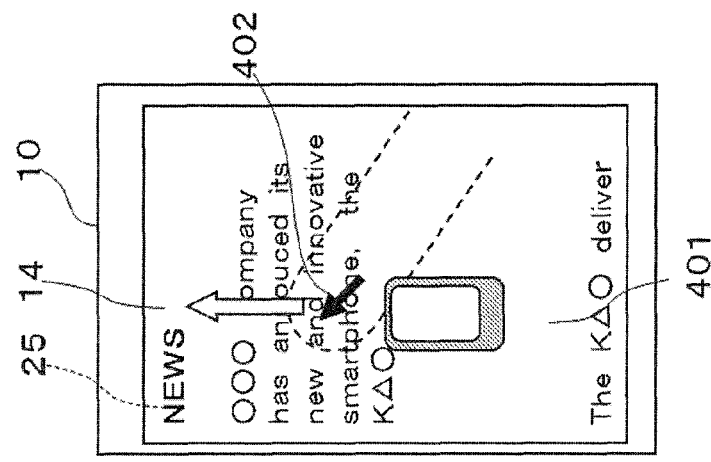
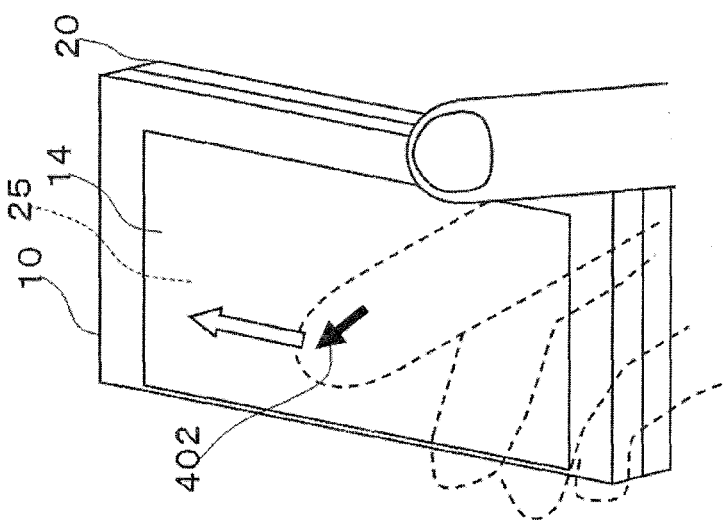

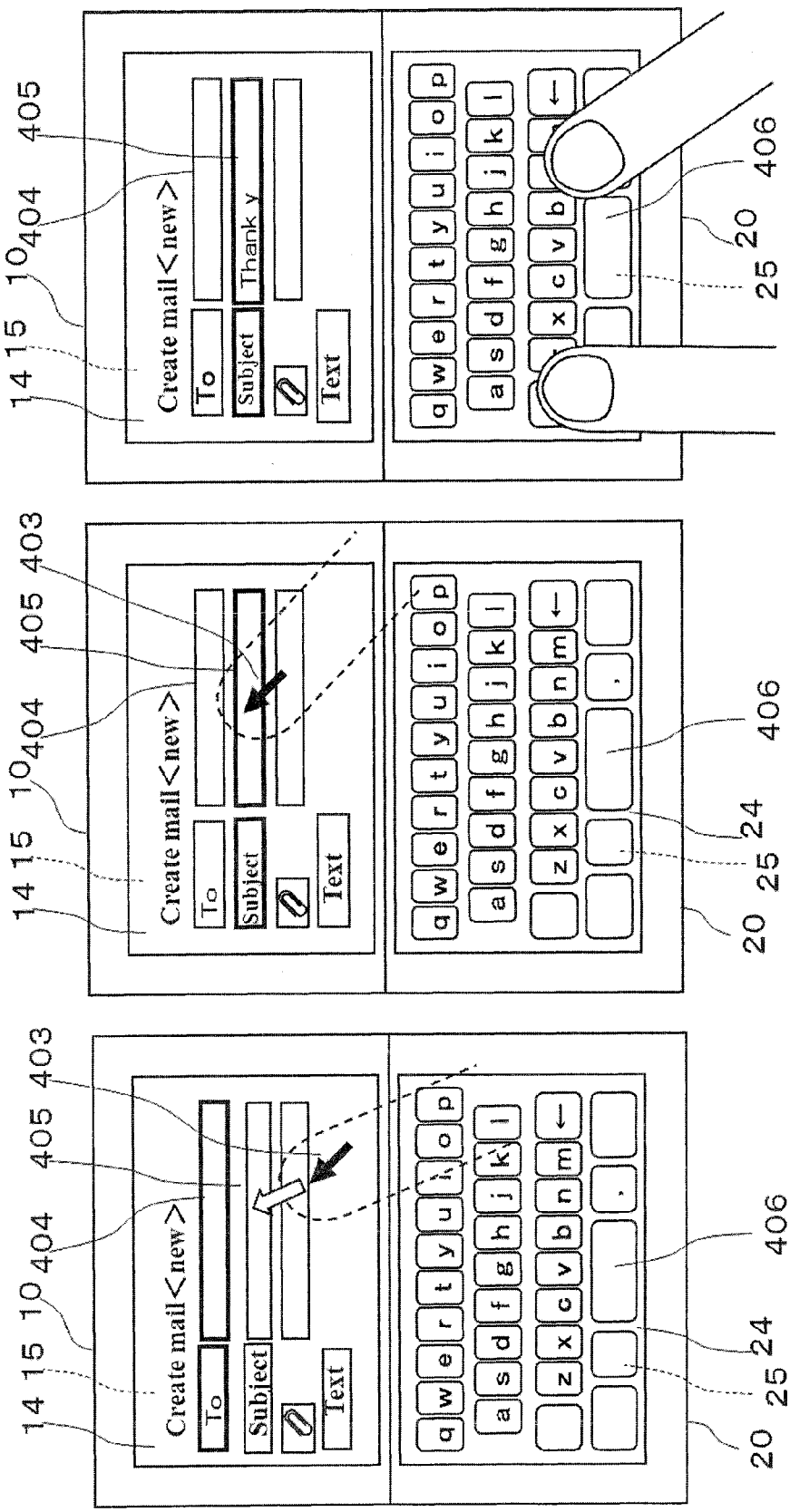

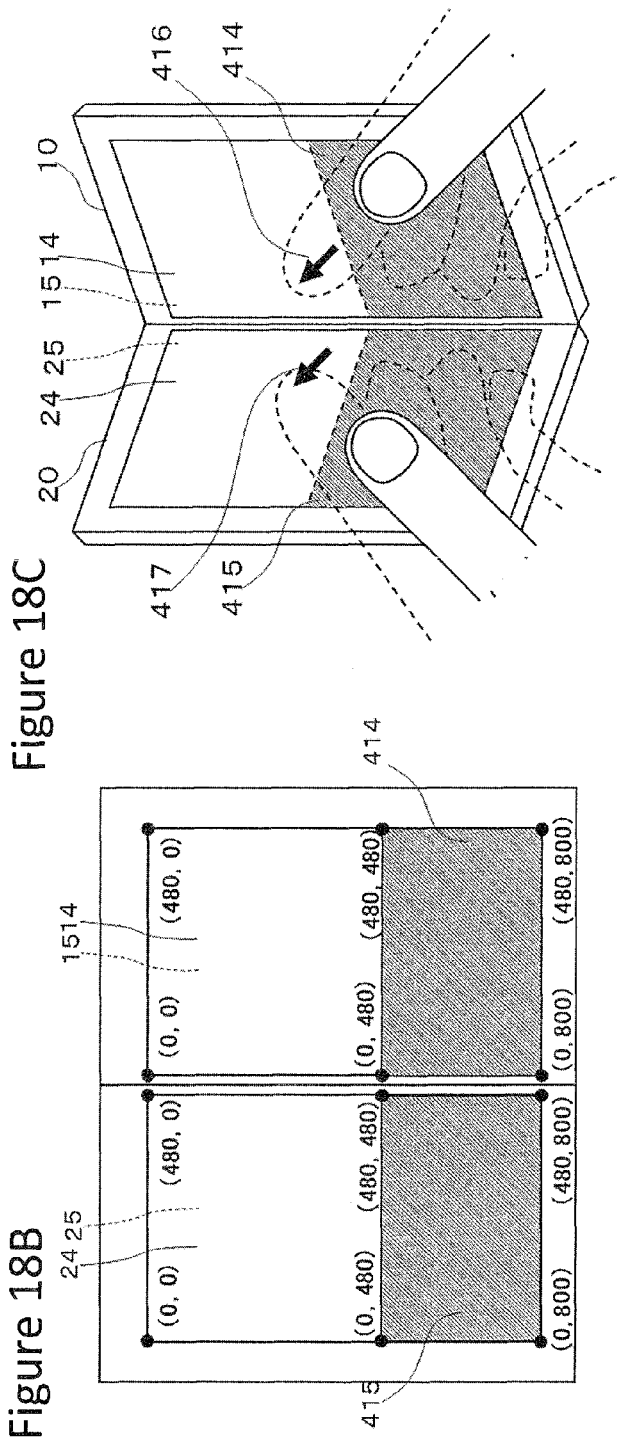

Figure 19B

```
           418
      10  /
   14 /  ┌─ 36/189
  /  /   │
 /  /    one-point space
         P vanishes unless
         n=0. The group
         H₀(P) is isomorphi
         c to Z, the abelia
         n group of the int
         egers.
         ─────────────────
         Exersice
         Prove the followin
         g, for any contrac
         tible space X, the
         homology grou
                         \
                   15    414

419
  20 /       35/189
24 /  /
 \ / /    gical spaces (X,
         A) is homotopy
         equivalence to
         (Y, B), then the
         two homology g
         roups Hn(X, A)
         and Hn(Y, B) ar
         e isomorphic to
         each other.
         ─────────────────
         2. Dimension
         The homology g
         roup Hᵢ(P) of t
         he
                   \
              25    415
```

Figure 19A

```
                  416   414
                    \    \
           418       \    \
      10  /           \    \
   14 /  ┌─ 34/189     \    \
  /  /   │
 /  /    Hₙ is a homoto   map   nduced homomor
         py functor. Na  →    phism g*, h*: H
         me              ←    ₙ(X, A)→Hₙ(Y, B)
         s g, h: (X, A)→       are the same
         (Y, B) are homo        Consequently, if
         topic to each ot
         her, then the i
                                      \
                                 15    414

419
  20 /       33/189
24 /  /      Eilenberg-Steenr
 \ / /       od axioms

The homology fu
         nctor Hₙ (n:integ
         ers) satisfies the
         following axioms
         called Eilenberg
         ─Steenrod axio
         ms.
         ─────────────────
         AXIM
         1 HOMOTOPY F
         UNCTOR
                   \
              25    415
         \
          415
```

The correspondence defining table associated with the e-mail application

| Screen state | First touch sensor | Second touch sensor | First rear touch sensor | Second rear touch sensor | Invalid region |
|---|---|---|---|---|---|
| Closed state | ○ | × | × | 1 | |
| Open state (I) | ○ | ○ | 1 | × | |
| Open state (II) | ○ | ○ | 1 | 2 | 1: (0, 480)～(480, 800)<br>2: (0, 480)～(480, 800) |
| Tilted state (I) | × | ○ | 1 | × | |
| Tilted state (II) | ○ | ○ | 1 | 2 | 1: (0, 480)～(480, 800)<br>2: (0, 480)～(480, 800) |

Figure 24A

The correspondence defining table associated with the e-mail application

| Screen state | First touch sensor | Second touch sensor | First rear touch sensor | Second rear touch sensor | Invalid region |
|---|---|---|---|---|---|
| Closed state | ○ | × | × | 1 | |
| Open state | ○ | ○ | 1 | 2 | |
| Tilted state (I) | × | ○ | 1 | × | |
| Tilted state (II) | ○ | ○ | 1 | 2 | 1: (0, 480)~(480, 800)<br>2: (0, 480)~(480, 800) |

Figure 24B

The correspondence defining table associated with the e-mail application

| Screen state | First touch sensor | Second touch sensor | First rear touch sensor | Second rear touch sensor | Invalid region |
|---|---|---|---|---|---|
| Closed state | ○ | × | × | 1 | |
| Open state | ○ | ○ | 1 | 2 | |
| Tilted state (I) | × | ○ | × | 1 | |
| Tilted state (II) | ○ | ○ | 1 | 2 | 1: (0, 480)~(480, 800)<br>2: (0, 480)~(480, 800) |

Figure 25

The correspondence defining table

| Screen state | First touch sensor | Second touch sensor | First rear touch sensor | Second rear touch sensor |
|---|---|---|---|---|
| Closed state | ○ | × | × | 1 |
| Open state | ○ | ○ | 1 & 2 | × |
| Tilted state (I) | × | ○ | × | 1 |
| Tilted state (II) | ○ | ○ | × | × |

MOBILE ELECTRONIC DEVICE

CROSS-REFERENCE TO RELATED APPLICATION

The present application claims priority under 35 U.S.C. §119 to Japanese Patent Application No. 2011-098751, filed on Apr. 26, 2011, entitled "MOBILE TERMINAL DEVICE and PROGRAM". The content of which is incorporated by reference herein in its entirety.

FIELD

Embodiments of the present disclosure relate generally to mobile electronic devices, and more particularly relate to mobile electronic device comprising more than one display screen thereon.

BACKGROUND

Some mobile phones may comprise a display surface and a rear touch sensor. A user may use an application program (hereinafter, referred to as "application") by inputting to the rear touch sensor. Also, some mobile phones may comprise two display surfaces. In such mobile phones, applications may be used in various conditions such as a condition in which a screen based on the application is displayed on one display surface, a condition in which the screen is displayed on two display surfaces, and the like.

SUMMARY

A device and methods for operating a mobile electronic device are presented. A condition of the mobile electronic device is detected to provide a condition of use. Correspondence relation between inputs detected at a first input detector and a second input detector and the inputs to a first display surface and a second display surface are stored in association with the condition of use. The inputs detected by one of the first input detector and the Second input detector are processed as the inputs to one of the first display surface and the second display surface based on the correspondence relation in association with the condition of use.

A composition of a mobile phone with a rear touch sensor attached to each rear side of a chassis with two display surfaces is new. In a mobile phone with two display surfaces, if a rear touch sensor is arranged on each rear side of the chassis with each display surface arranged, and if inputs to each rear touch sensor is reflected via the inputs to the display surface in correspondence with the condition of use of the mobile phone, it is very convenient for the user.

In an embodiment a mobile electronic device comprises a first chassis comprising a first surface and a third surface facing the first surface, a second chassis comprising a second surface and a fourth surface facing the second surface. A first display surface is provided on the first surface, and a second display surface is provided on the second surface. A first input detector is provided on the third surface is operable to detect inputs. A second input detector is provided on the fourth surface and is operable to detect the inputs.

Further, a condition detector detects a condition of the mobile electronic device to provide a condition of use and a memory store, in association with the condition of use, correspondence relation between the inputs detected at the first input detector and the second input detector and the inputs to the first display surface and the second display surface. In addition, a control module is operable to process the inputs detected by one of the first input detector and the second input detector as the inputs to one of the first display surface and the second display surface based on the correspondence relation in association with the condition of use.

In another embodiment, a method for operating a mobile electronic device detects a condition of the mobile electronic device to provide a condition of use. The method further, stores in association with the condition of use, correspondence relation between the inputs detected at a first input detector and a second input detector and the inputs to a first display surface and a second display surface. The method further processes the inputs detected by one of the first input detector and the second input detector as the inputs to one of the first display surface and the second display surface based on the correspondence relation in association with the condition of use.

In a further embodiment, a computer readable storage medium comprising computer-executable instructions for operating a mobile electronic device, the method executed by the computer-executable instructions detects a condition of the mobile electronic device to provide a condition of use. The method executed by the computer-executable instructions further stores in association with the condition of use, correspondence relation between inputs detected at a first input detector and a second input detector and inputs to a first display surface and a second display surface. The method executed by the computer-executable instructions further processes the inputs detected by one of the first input detector and the second input detector as the inputs to one of the first display surface and the second display surface based on the correspondence relation in association with the condition of use.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure.

FIGS. 1A to 1D are diagrams showing a configuration of a mobile phone in a closed state and an open state according to an embodiment of the disclosure.

FIG. 5 is a diagram illustrating conditions of use of a mobile phone according to an embodiment of the disclosure.

FIGS. 8A and 8B are tables showing a correspondence defining table according to an embodiment of the disclosure.

FIGS. 9A to 9C are diagrams showing a situation in which a mobile phone in a closed state is operated, and an exemplary display of an execution screen of an application according to an embodiment of the disclosure.

FIGS. 17A to 17C are diagrams showing a display example of an execution screen of an application in a tilted state (I) according to an embodiment of the disclosure.

FIGS. 18A to 18C illustrate a table showing an example of a correspondence defining table and a diagram showing a situation in which a mobile phone in a tilted state (II) is operated according to an embodiment of the disclosure.

FIGS. 19A and 19B are diagrams showing a display example of an execution screen in a tilted state (II) according to an embodiment of the disclosure.

FIGS. 24A and 24B are diagrams showing examples of correspondence defining tables according to an embodiment of the disclosure FIG. 25 is a table showing an example of a correspondence defining table according to an embodiment of the disclosure.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, a mobile electronic device such as a mobile phone. Embodiments of the disclosure, however, are not limited to such mobile phone, and the techniques described herein may be utilized in other applications. For example, embodiments may be applicable to digital books, digital cameras, electronic game machines, digital music players, personal digital assistance (FDA), personal handy phone system (PHS), lap top computers, TV's, iPod™, iPad™, Global Positioning Systems (GPSs) or navigation systems, health equipment, display monitors, or other electronic device that uses a display screen or a touch panel for displaying information.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

<Configuration of the Mobile Phone 1>

FIGS. 1A to 1D are diagrams showing a configuration of a mobile phone in a closed state and an open state according to an embodiment of the disclosure. Mobile phone 1 comprises two cabinets and two display surfaces (a first display surface and a second display surface). The first display surface is arranged on a surface in front of one cabinet and the second display surface is arranged on a surface in front of the other cabinet. Touch sensors are respectively arranged on the front and back surfaces of each cabinet. That is to say, four touch sensors are arranged on the mobile phone 1.

As mentioned below, a user may input to a screen displayed on the first display surface or the second display surface by operating the touch sensor (first rear touch sensor or second rear touch sensor) on the back side.

Figure 2B:
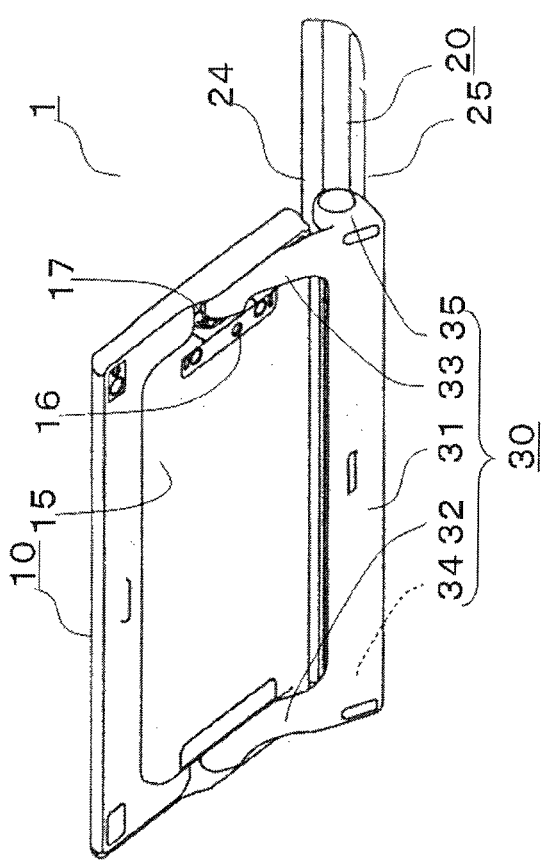
FIGS. 2A and 2B are diagrams showing a configuration of a mobile phone in a tilted state according to an embodiment of the disclosure.
Figure 2A:
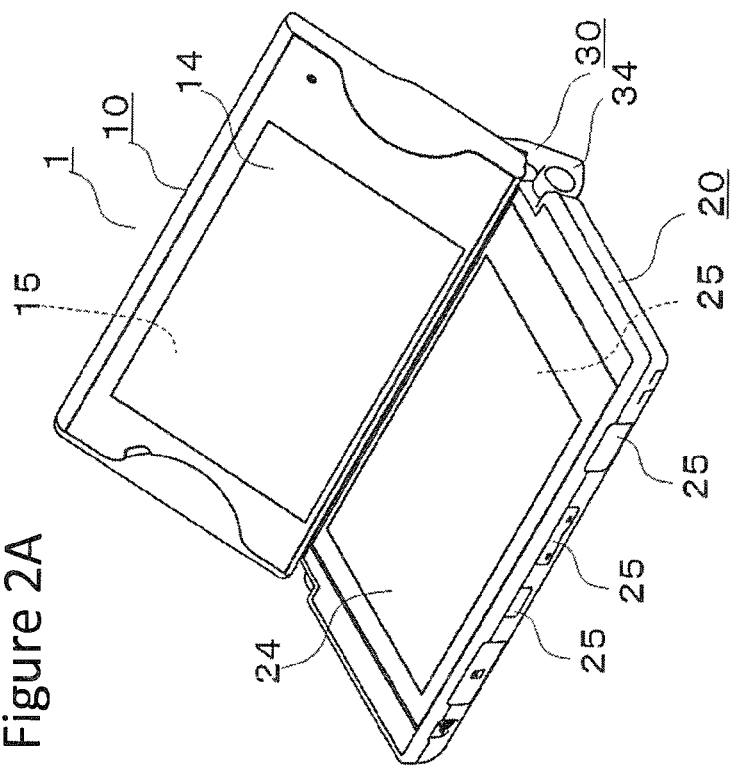

FIGS. 2A and 2B are diagrams showing a configuration of a mobile phone in a tilted state according to an embodiment of the disclosure. FIG. 1A is a perspective diagram showing the configuration of the mobile phone 1 in the closed state, while FIG. 1B is a perspective diagram showing the configuration of the mobile phone 1 in the open state. FIG. 1C is an internal perspective view when the mobile phone 1 of FIG. 1A is viewed from the right side, while FIG. 1D is an internal perspective view when the mobile phone 1 of FIG. 1B is viewed from a right side. FIG. 2A is a perspective diagram when the mobile phone 1 in a tilted state is viewed from the near side of a first cabinet 10, while FIG. 2B is a perspective diagram when the mobile phone 1 in a tilted state is viewed from the far side of the first cabinet 10.

The mobile phone 1 comprises three screen states such as a closed state, an open state, and a tilted state.

The mobile phone 1 comprises the first cabinet 10, a second cabinet 20 (second chassis 20), and a connection 30 that connects the first cabinet 10 and the second cabinet 20.

Hereinafter, the directions "right," "left," "up," and "down" regarding the mobile phone 1 are set as shown in FIGS. 1A and 1B. A forward direction of an X-axis, Y-axis, and Z-axis correspond to an upper, left, and near directions, respectively. However, in the tilted state of FIGS. 2A and 2B, the direction in which the front surface of first cabinet 10 faces is the "near"

direction of the first cabinet 10, while a short one-way of a first display surface 14 of the first cabinet 10 is the "up" and "down" direction of the first cabinet 10 (first chassis 10).

The closed state is, as shown in FIG. 1A, a state in which the first cabinet 10 is placed on top of the front side of the second cabinet 20. The open state is, as shown in FIG. 1B, a state in which the first cabinet 10 is arranged upwards of the second cabinet 20.

The first cabinet 10 may be a flat rectangular parallelepiped shape long to the left and the right. The first cabinet 10 comprises a first touch panel 11. The first touch panel 11 comprises a first display 12 and a first touch sensor 13.

The first display 12 may display a first display. A user may view a first screen via a first display surface 14 covering the first touch panel 11 by turning on a back light (not illustrated) provided on the first display 12.

The first touch sensor 13 (first input detector) comprises a clear rectangle sheet covering the first display 12. The first touch sensor 13 may detect a location (input location) on a touched first display surface 14 when the first display surface 14 is touched. The first touch sensor 13 outputs a location signal comprising information regarding the detected location.

The user "touching" the first display surface 14 refers to the user touching the first display surface 14 with a contact member such as a finger, pen, and the like. A "touch" is carried out when the user pushes, strokes, or draws figures or letters on the first display surface 14 using the contact member. The user "tapping" the first display surface 14 refers to an action of touching with the contact member in a location with the first display surface 14 so as to flick the first display surface 14 with the contact member or the finger and release it within a short period of time. The user "sliding" the first display surface 14 refers to an action of the user moving the contact member or the finger along the first display surface 14 while still touching the first display surface 14.

A first rear touch sensor 15 is arranged on the rear of the first cabinet 10. The first rear touch sensor 15 comprises a clear rectangle sheet substantially the same size as the first display surface 14. The first rear touch sensor 15 is arranged in a location approximately overlapping the first display surface 14 when seen from the near side of the first cabinet 10. The first rear touch sensor 15 detects the touch location when the user touches the first rear touch sensor 15. The first rear touch sensor 15 outputs the location signal corresponding to the detected location.

A lens window 15 (refer to FIG. 2B) used for taking moving pictures and still diagrams is arranged on the left rear surface of the first cabinet 10.

The second cabinet 20 comprises a flat rectangular parallelepiped shape long to the left and the right. A second touch panel 21 is arranged on the second cabinet 20. The configuration of the second touch panel 21 is the same as the configuration of the first touch panel 11. The second touch panel 21 comprises a second display 22 and a second touch sensor 23.

The second display 22 displays a second screen. A user may view the second screen via a second display surface 24, which is the outer side of the second touch panel 21, by turning on a back light (not illustrated) provided on the second display 22.

The second touch sensor 23 (second input detector) comprises a clear rectangular sheet which is arranged on the second display 22 by overlapping. The second touch sensor 23 detects the location on the touched second display surface 24 when the user touches the second display surface 24. The second touch sensor 23 outputs the location signal corresponding to the detected location.

A second rear touch sensor 25 is arranged to the rear surface of the second cabinet 20. The second rear touch sensor 25 comprises a clear rectangle sheet substantially the same size as the second display surface 24. The second rear touch sensor 25 is arranged in a location approximately overlapping the second display surface 24 when seen from the near side of the second cabinet 20. The second rear touch sensor 25 detects the touch location when the user touches the second rear touch sensor 25. The second rear touch sensor 25 outputs the location signal corresponding to the detected location.

A hard key group 26 is arranged on the lower lateral surface of the second cabinet 20. A hard key group 26 comprises a power key, a volume control key, a key to use a camera function, and the like.

With reference to FIG. 1C, the first touch panel 11 faces outside from the near side of the mobile phone 1 in the closed state, while the second rear touch sensor 25 faces outside from the far side of the mobile phone 1. The first rear touch sensor 15 and the second touch panel 21 overlaps each other. Consequently, the first rear touch sensor 15 and the second touch panel 21 are not exposed outside in the closed state.

With reference to FIG. 1D, the first touch panel 11 and the second touch panel 21 face outside from the near side of the mobile phone 1 in the open state. The first rear touch sensor 15 and the second rear touch sensor 25 face outside from the far side of the mobile phone 1.

In the open state, the lower boundary of the first display surface 14 is located close to the lower lateral surface (a few millimeters) of the first cabinet 10. In the same manner, the upper boundary of the second display surface 24 is located close to the upper lateral surface (a few millimeters) of the second cabinet 20. Thus, there is a small gap between the first display surface 14 and the second display surface 24 in the closed state; consequently, the user may recognize the first display surface 14 and the second display surface 24 as one integrated display surface.

In the tilted state of FIGS. 2A and B, the first touch panel 11 and the second touch panel 21 respectively face outside from the near side of each cabinet 10 and 20 in the same manner as the open state (FIG. 1D). The first rear touch sensor 15 and the second rear touch sensor 25 face outside from the far side of the mobile phone 1.

With reference to FIGS. 2A and B, the connection 30 comprises a central frame 31, a first right frame 32, a first left frame 33, a second right frame 34, and a second left frame 35. The central frame 31 has a shape extending to the left and right. The right end of the central frame 31 is connected to one end of the first right frame 32 and one end of the second right frame 34. The left end of the central frame 31 is connected to one end of the first left frame 33 and one end of the second left frame 35.

Axes each extending to the left and right are arranged at the other ends of the first right frame 32 and the first left frame 33. These axes are sandwiched by a groove 17 arranged to the left and right lateral side of the first cabinet 10. In FIG. 2, only the groove 17 of the left lateral side is illustrated. The first cabinet 10 is maintained in the first right frame 32 and the first left frame 33, allowing for rotation on its axis along the groove 17 while allowing vertical sliding due to these axes being maintained in the first cabinet 10 along the groove 17 allowing for sliding movement.

The second right frame 34 and the second left frame 35 rotatably maintain the second cabinet 20 with the horizontal direction as the axis.

FIGS. 3A to 3F are diagrams illustrating a process in which a screen state of a mobile phone transitions from a closed state to an open state via a tilted state by viewing from a left side of the mobile phone. As shown in FIGS. 3A to 3F the screen state of the mobile phone 1 transitions from the closed state (FIG. 3A) to the open state (FIG. 3F) via the tilted state (FIG. 3D) by viewing from the left side of the mobile phone 1. The user may transform the mobile phone 1 so as to transit the mobile phone 1 in this manner.

Figures 3A, 3B, 3C, 3D, 3E, 3F:
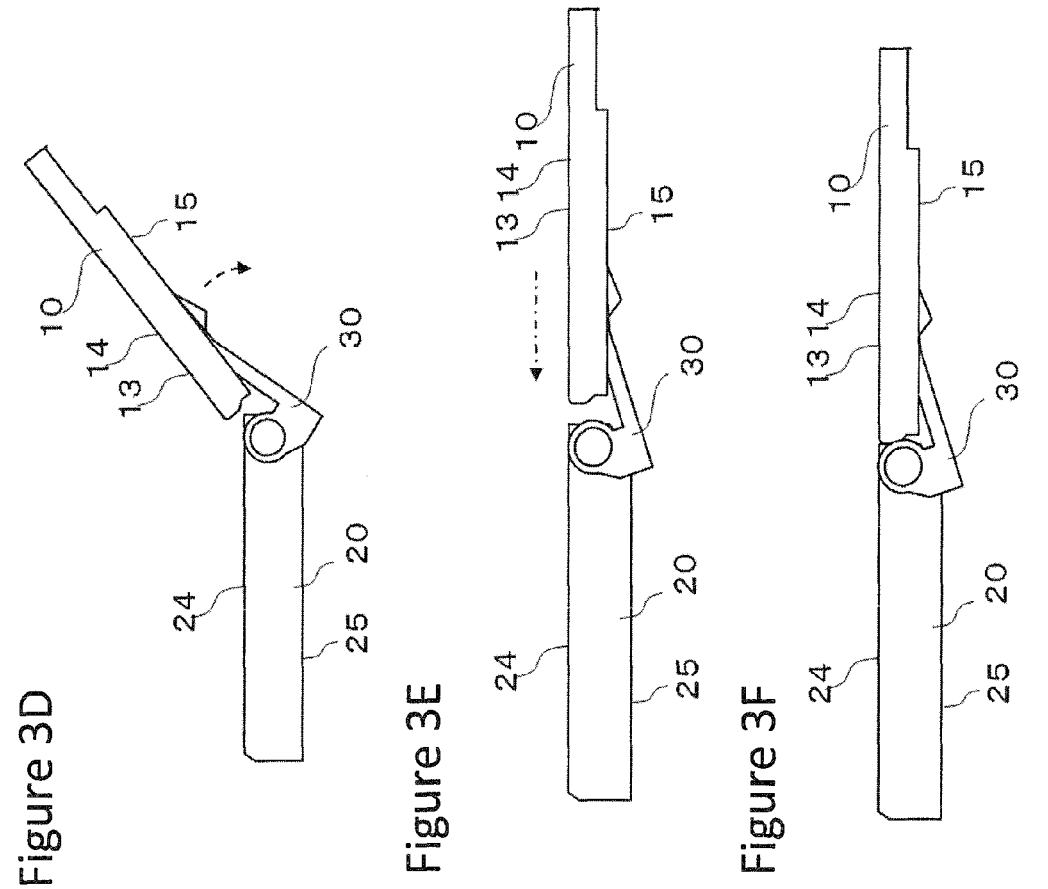
FIGS. 3A to 3F are diagrams illustrating a process in which a screen state of a mobile phone transitions from a closed state to an open state via a tilted state by viewing from a left side of the mobile phone.

When the mobile phone 1 is in the closed state as in FIG. 3A, if the first cabinet 10 is moved to the near direction (dashed arrow of FIG. 3A), as shown in FIG. 3B, the rear surface of the first cabinet 10 separates from the front surface of the second cabinet 20. At this time, a connection 30 rotates (solid arrow) clockwise in correspondence with the movement of the first cabinet 10.

In the situation shown in FIG. 3B, if the first cabinet 10 is further moved in the near direction and the first display surface 14 is rotated such that it faces down (dashed arrow), the first cabinet 10 and the connection 30 are arranged as shown in FIG. 3C.

In the situation according to FIG. 3C, if the first cabinet 10 is further rotated counterclockwise until the bottom back surface of the first cabinet 10 contacts the connection 30, and if the connection 30 is further rotated clockwise, the mobile phone 1 ends up in the tilted state as in FIG. 3D.

In the tilted state, if the connection 30 is rotated clockwise (dashed arrow) while maintaining the condition of the bottom rear surface of the first cabinet 10 contacting the connection 30, the mobile phone 1 will be in the state shown in FIG. 3E. That is to say, the first display surface 14 and the second display surface 24 become substantially one surface.

In the state shown in FIG. 3E, there is a gap (a few millimeters) between the first cabinet 10 and the second cabinet 20. When the first cabinet 10 is slid downwards to the second cabinet 20 (dashed-line arrow), the mobile phone 1 ends up in the open state, as in FIG. 3F. At this time, the lower lateral surface of the first cabinet 10 and the upper lateral surface of the second cabinet 20 contact each other.

When the mobile phone 1 is in the tilted state shown in FIG. 3D, that is to say, in a state in which the first right frame 32, the first left frame 33, and the second cabinet 20 form an obtuse angle (for example, one hundred and several tens of degrees), the connection 30 has a configuration to weakly lock the rotation of the connection 30. Because the rotation is weakly locked, the mobile phone 1 may be used by the user while maintaining the tilted state and the user may easily change the tilted state to the open state or the closed state.

Figure 4:
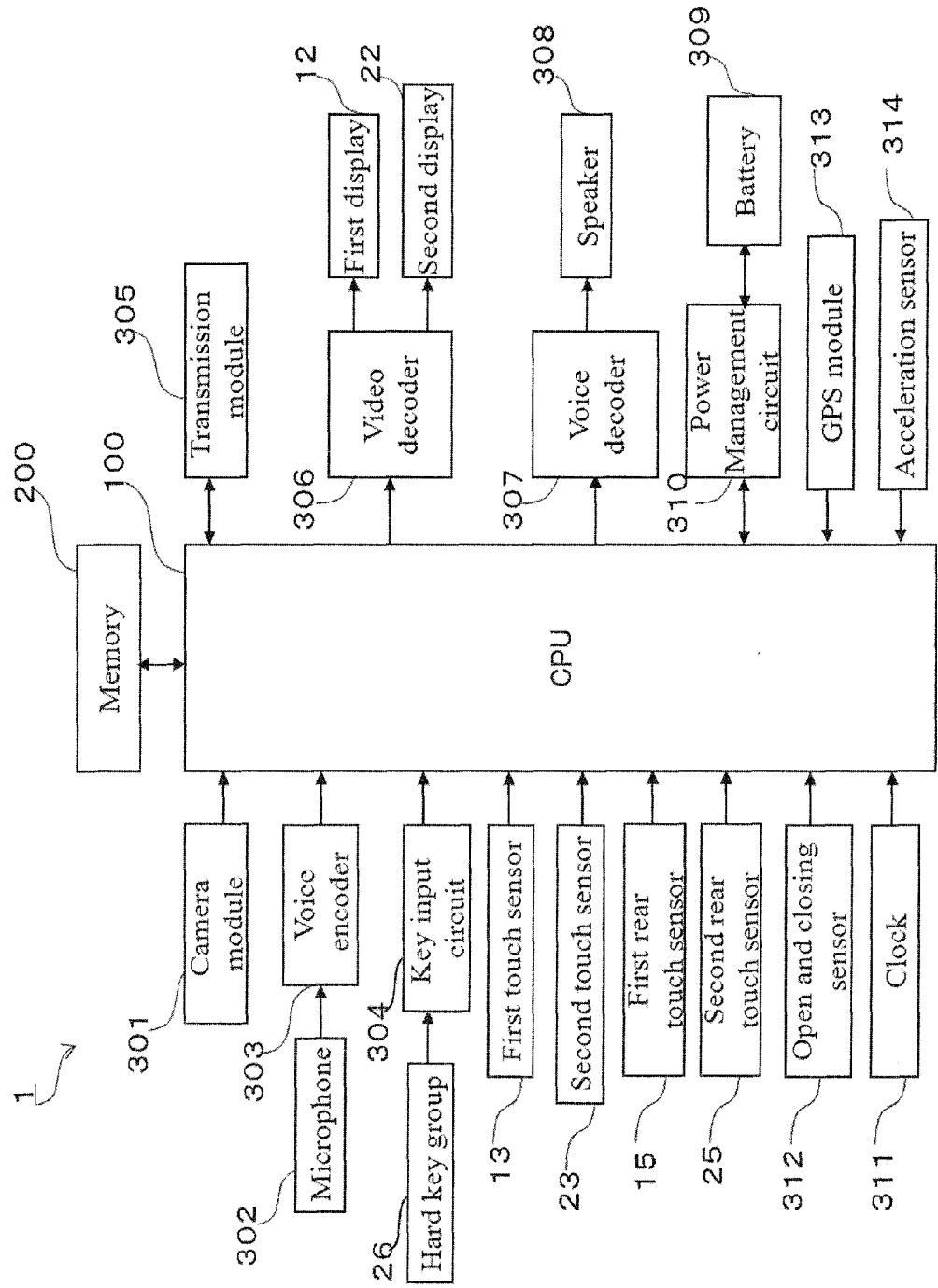
FIG. 4 is a functional block diagram of a mobile phone according to an embodiment of the disclosure.

FIG. 4 is a functional block diagram of a mobile phone 1 according to an embodiment of the disclosure. The mobile phone 1 comprises a CPU100, a memory 200, a camera module 301, a microphone 302, a voice encoder 303, a key input circuit 304, a communication module 305, a video decoder 306, a voice decoder 307, a speaker 308, a battery 309, a power managing circuit 310, a clock 311, an opening and closing sensor 312, a GPS module 313, and an acceleration sensor 314 in addition to each component mentioned above.

The camera module 301 is arranged in the first cabinet 10. The camera module 301 comprises a lens window 16 facing outside from the rear surface of the first cabinet 10. The camera module 301 takes diagrams via the lens window 16 and generates a digital imaging signal by the video encoder (not illustrated) built in the camera module 301. The camera module 301 outputs the generated imaging signal to the CPU100.

The microphone 302 is arranged in the first cabinet 10. The microphone 302 converts the collected sound to a voice signal and outputs this to the voice encoder 303. The voice encoder 303 converts the analog voice signal from the microphone 302 to a digital voice signal and outputs the converted digital voice signal to the CPU100.

When each key of a hard key group 26 is pushed, the key input circuit 304 outputs signals corresponding to the pushed key to the CPU100.

The communication module 305 comprises an antenna (not illustrated) that transmits radio waves for calling or communicating. The communication module 305 converts signals input from the CPU100 to wireless signals and sends the wireless signals to the base station via the antenna. The communication module 305 converts the wireless signals received via the antenna to a signal in a form that may be used by the CPU100 and outputs the converted signal to the CPU100.

The video decoder 306 decodes the diagram signal from the CPU100 and, based on control signals from the CPU100, outputs the decoded signal to the first display 12 and the second display 22. The first display 12 and the second display 22 generate driving signals from the signals from the video decoder 306 and each output the generated driving signals to a liquid crystal panel (not illustrated) comprised in the first display 12 and the second display 22. Each liquid crystal panel renders the first screen and the second screen in correspondence with the input driving signal. The first display 12 and the second display 22 turn on or off the back light comprising the first display 12 and the second display 22 based on the control signals from the CPU100. The user may observe the displayed first screen and the second screen via the first display surface 14 and the second display surface 24 by the back light being turned on and the screen rendered on the liquid crystal panel being displayed.

The CPU100 stops rendering of the second diagram and outputs control signals to the second display 22 so that the back light of the second display 22 is turned off when the screen state transitions from the open state or the tilted state to the closed state. When the screen state transitions from the closed state to the open state or the tilted state, the CPU100 commences rendering of the second diagram and outputs control signals to the second display 22 so as to turn on the back light of the second display 22.

The voice decoder 307 performs decoding processing and D/A conversion on audio signals from the CPU100 and outputs the converted signals to the speaker 308. The speaker 308 outputs sound based on signals input from the voice decoder 30.

The battery 309 comprises a rechargeable battery and supplies electricity to each section composing the mobile phone 1.

The power managing circuit 310 outputs control signals for charging the rechargeable battery and the like to the battery 309 in addition to obtaining a variety of information related to the battery 309 based on the control signals from the CPU100. The power managing circuit 310 detects voltage output by the rechargeable battery and outputs the digital signals corresponding to the detected voltage to the CPU100. The CPU100 detects the approximate residual electricity that may be output by the rechargeable battery based on these digital signals.

The clock 311 calculates the time and outputs signals in correspondence with the calculated time to the CPU100.

The opening and closing sensor 312 detects the angle of the connection 30 to the second cabinet 20. The opening and closing sensor 312 comprises an angle sensor that detects the angle formed by the second cabinet 20 and the connection 30 and outputs the digital signals in correspondence with the detected angle to the CPU 100. The CPU100 conducts a process of detecting whether the screen state of the mobile phone 1 is the open state, closed state, or tilted state based on signals from the opening and closing sensor 312.

The screen state may also be detected by means other than the angle sensor. For example, the opening and closing sensor may comprise a magnetometric sensor and a magnet. In this case, for example, the magnetometric sensor is arranged in the second cabinet 20, while the magnet is arranged in the first cabinet 10 or the connection 30. This opening and closing sensor outputs to the CPU100 signals allowing the CPU100 to detect the open and close state based on the fact that the magnetometric sensor detects different magnetic forces depending on the screen state.

The GPS module 313 locates the current geographical location such as longitude, latitude, and the like based on signals from various GPS satellites and outputs the positional information thereof, that is to say, the GPS information to the CPU100.

The acceleration sensor 314 detects acceleration applied to the mobile phone 1. The acceleration sensor 314 is a three-axis acceleration sensor that detects acceleration generated in the three directions of the X-axis direction, Y-axis direction, and Z-axis direction of FIG. 1. The acceleration sensor 314 outputs acceleration signals corresponding with the detected acceleration to the CPU 100. The CPU100 detects whether the mobile phone 1 is facing the horizontal direction or vertical direction based on the acceleration signals from the acceleration sensor 314.

The memory 200 may be any suitable data storage area with suitable amount of memory that is formatted to support the operation of an electronic device such as the mobile phone 1. The memory 200 is configured to store, maintain, and provide data as needed to support the functionality of the mobile phone 1 in the manner described below. In practical embodiments, the memory 200 may comprise, for example but without limitation, a non-volatile storage device (non-volatile semiconductor memory, hard disk device, optical disk device, and the like), a random access storage device (for example, SRAM, DRAM), or any other form of storage medium known in the art. The memory 200 stores a control program providing a control function to the CPU 100.

A control program in order to grant control function to the CPU100 is stored in the memory 200. When the CPU100 conducts the control program, the memory 200 is also used as a working memory that stores data that is temporarily used or generated.

Diagram data, information externally taken in via the communication module 305, information input from the first and second touch sensor 13 and 23, and the like are saved in the memory 200 in a predetermined file format in addition to the control program.

The memory 200 stores a correspondence defining table, as mentioned below The correspondence defining table comprises information in order to validly or invalidly set inputs to the first touch sensor 13, the second touch sensor 23, the first rear touch sensor 15, and the second rear touch sensor 25 in correspondence with the condition of use. The correspondence defining table further comprises information in order to determine whether inputs to the rear touch sensor considered as valid should be corresponded to the first display surface 14 or the second display surface 24 when inputs to the first rear touch sensor 15 or the second rear touch sensor 25 are considered valid.

The CPU 100 is configured to support functions of an electronic device such as the mobile phone 1. For example, the CPU100 actuates the camera module 301, the microphone 302, the communication module 305, the first display 12, the second display 22, the speaker 308, and the like, according to inputs by operation and/or the control program. For another example, the CPU 100 controls so as to turn on and off the back light to the second display 22 in correspondence with the change of screen state. When the screen state is the closed state, the CPU 100 turns off the back light of the second display 22. When the screen state is the open state or tilted, the CPU100 turns on the back light of the second display 22.

Thus, the CPU 100 executes various applications, such as a phone call function, an e-mail function, a key-lock function, or other function.

The CPU 100, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Thereby, the CPU100 conducts various applications such as phone calls, the camera function, e-mail, web browser, music player, and the like. The CPU 100 as a condition detector detects a condition of the mobile phone 1 to provide a condition of use. The condition detector also detects the open state, the tilted state, and the closed state as the condition of use.

The CPU as a control module is configured to process inputs detected by one of the first input detector and the second input detector as inputs to one of the first display surface 14 and the second display surface 24 based on the correspondence relation in association with the condition of use. Input detector and touch sensor may be used interchangeably in this document.

The CPU 100 as the control module also processes the inputs detected by the first input detector and the second input detector as inputs to the first display surface 14 and the second display surface 24 based on the correspondence relation associated with the condition of use and the application in process.

The CPU 100 as the control module also prevents processing the input as an input to one of the first display surface 14 and the second display surface 24 when the input detected by one of the first input detector and the second input detector is within the invalid region. The invalid region may a predetermined invalid region.

The control module is further operable to scroll a screen displayed on the first display module and the second display module when an operation of sliding is carried out to one of the first input detector and the second input detector.

The CPU as a correspondence setter receives an operation to change a setting of the correspondence relation to provide a changed correspondence relation and cause the memory to store the changed correspondence relation.

The CPU as a supporting section supports the first chassis (first cabinet 10) and the second chassis (second cabinet 20) with an open state arranged such that the first display surface 14 and the second display surface 24 are approximately flush, a tilted state arranged such that the first display surface 14 and the second display surface 24 form a predetermined obtuse angle, and a closed state in which the first display surface 14 is exposed to the outer side while the second display surface 24 is covered by the first chassis.

FIG. 5 is a diagram illustrating conditions of use of a mobile phone according to an embodiment of the disclosure.

The "conditions of use" assumes 6 types of states depending on the screen state and direction of the mobile phone 1. The screen state consists of three states of the closed state, open state, and tilted state. The direction consists of two directions of vertical and horizontal. Hereinafter, the above-mentioned three screen states when the direction of the mobile phone 1 is vertical are each indicated as a closed state (I), an open state (I), and a tilted state (I), while the above-mentioned three screen states when the direction of the mobile phone 1 is horizontal are each indicated as a closed state (II), an open state (II), and a tilted state (II).

FIGS. 6A to 6D are diagrams schematically illustrating the correspondence of how inputs to the first rear touch sensor 15 and the second rear touch sensor 25 are associated with inputs to the first display surface 14 and the second display surface 24.

The first display surface 14 and the second display surface 24 when the mobile phone 1 in the open state is seen from the near side are shown on the left side of each of Figures A to D, while the first and the second rear touch sensors 15 and 25 when the mobile phone 1 in the open state is observed from the near side are shown on the right side of each of FIGS. 6A to D. In FIGS. 6A to D, location of operations to the first and the second rear touch sensors 15 and 25 and the location of inputs to the first display surface 14 to the second display surface 24 by the operations are each indicated with a black circle and square, respectively.

Figure 6A:
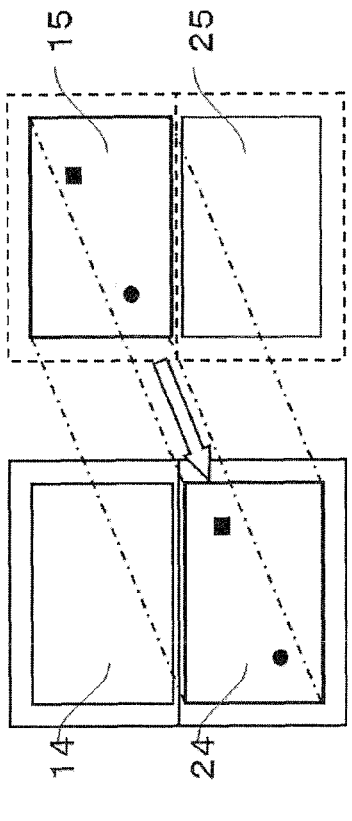
FIGS. 6A to 6D are diagrams schematically showing correspondence with an input to a display surface of the input to a rear touch sensor according to an embodiment of the disclosure.

In FIG. 6A, inputs to the first rear touch sensor 15 are processed as inputs to the first display surface 14. The CPU100 detects the input location, that is to say, the coordinates of the touch location from the signal input from the first rear touch sensor 15. Then, the CPU100 converts the detected coordinates to coordinates on the display of the first display surface 14 and obtains the converted coordinates as the input location to the first display surface 14.

The CPU100 conducts processing related to this input based on an application in process. For example, as shown in FIG. 6A, when the location indicated with the black circle or square on the first rear touch sensor 15 is touched, the CPU100 regards this touch as an input at the location indicated with the black circle or square on the first display surface 14, respectively. The CPU100 conducts processing to correspond with the black circle or square on the first display surface 14.

Figure 6B:
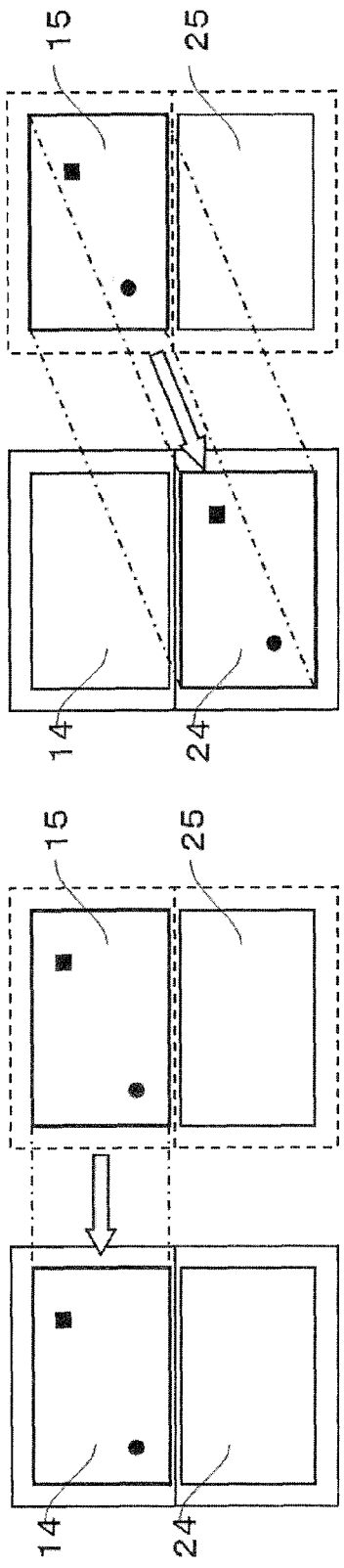

In FIG. 6B, inputs to the first rear touch sensor 15 are processed as inputs to the second display surface 24. When inputs to the first rear touch sensor 15 (touch) are conducted, in the same manner as in the case of FIG. 6A, the CPU100 obtains the coordinates on the second display surface 24 corresponding to the touch location as the input location to the second display surface 24. Then, the CPU100 conducts processing related to this input based on the application in process. For example, when the location indicated with the black circle or square on the first rear touch sensor 15 is touched, the CPU100 regards this touch as an input at the location indicated with the black circle or square on the second display surface 24, respectively. The CPU100 conducts processing corresponding to the location indicated with the black circle or square on the second display surface 24.

Figure 6C:
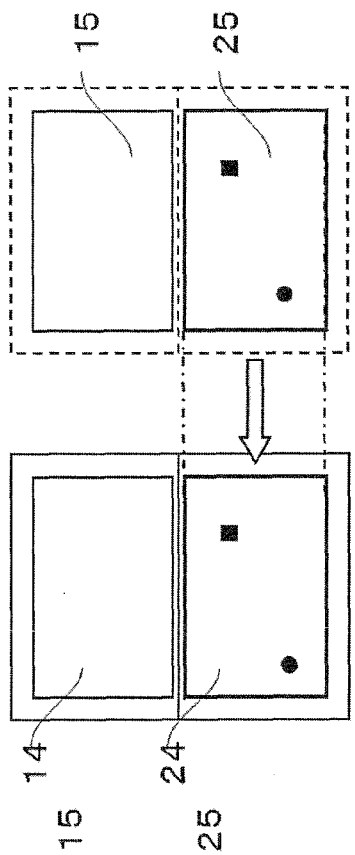

In FIG. 6C, inputs to the second rear touch sensor 25 are processed as inputs to the first display surface 14. In this case as well, in the same manner as in the case of FIG. 6A, the CPU100 obtains the coordinates on the first display surface 14 corresponding to the touch location as the input location to the first display surface 14 when inputs (touch) to the second rear touch sensor 25 are carried out. For example, the CPU100 regards a touch at the location indicated with the black circle or square on the second rear touch sensor 25 as an input at the location indicated with the black circle or square of the first display surface 14, respectively. The CPU100 conducts processing corresponding to the location indicated with the black circle or square of the first display surface 14.

Figure 6D:
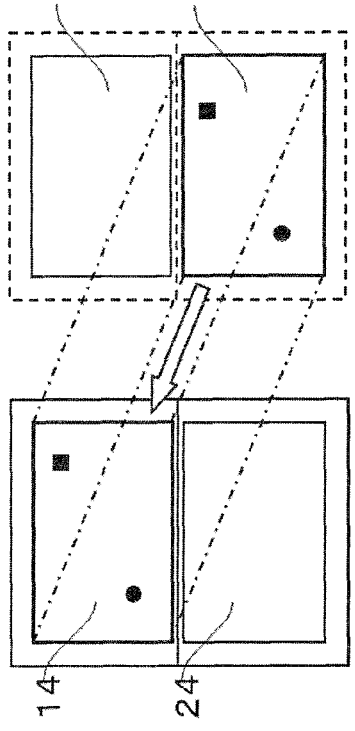

In FIG. 6D, inputs to the second rear touch sensor 25 are processed as inputs to the second display surface 24. In this case as well, when inputs to the second rear touch sensor 25 (touch) are conducted in the same manner as in the case of FIG. 6A, the CPU100 obtains the coordinates on the second display surface 24 corresponding to the touch location as the input location to the second display surface 24. For example, the CPU100 regards the touch at the location indicated with the black circle or square on the second rear touch sensor 25 as an input at the location indicated with the black circle or square on the second display surface 24, respectively. The CPU100 conducts processing corresponding to the location indicated with the black circle or square on the second display surface 24.

The screen state comprises the open state in FIGS. 6A to D; however, even when the screen state is the tilted state, inputs to the first rear touch sensor 15 and the second rear touch sensor 25 are associated with inputs to the first and second display surface 14 and 24 in the same manner as FIGS. 6A to D. However, in the closed state, the second display surface 24 and the first rear touch sensor 15 are not exposed outside (refer to FIG. 1C), so the correspondence of FIG. 6C is applied.

The correspondence of the first and second rear touch sensors 15 and 25 with the first and second display surfaces 14 and 24, which is explained in FIG. 6, is maintained in the abovementioned correspondence defining table stored in the memory 200. The CPU100 sets the correspondence of any of FIGS. 6A to D in correspondence with each condition of use shown in FIG. 5 based on the correspondence defining table.

Embodiment 1

Figure 7:
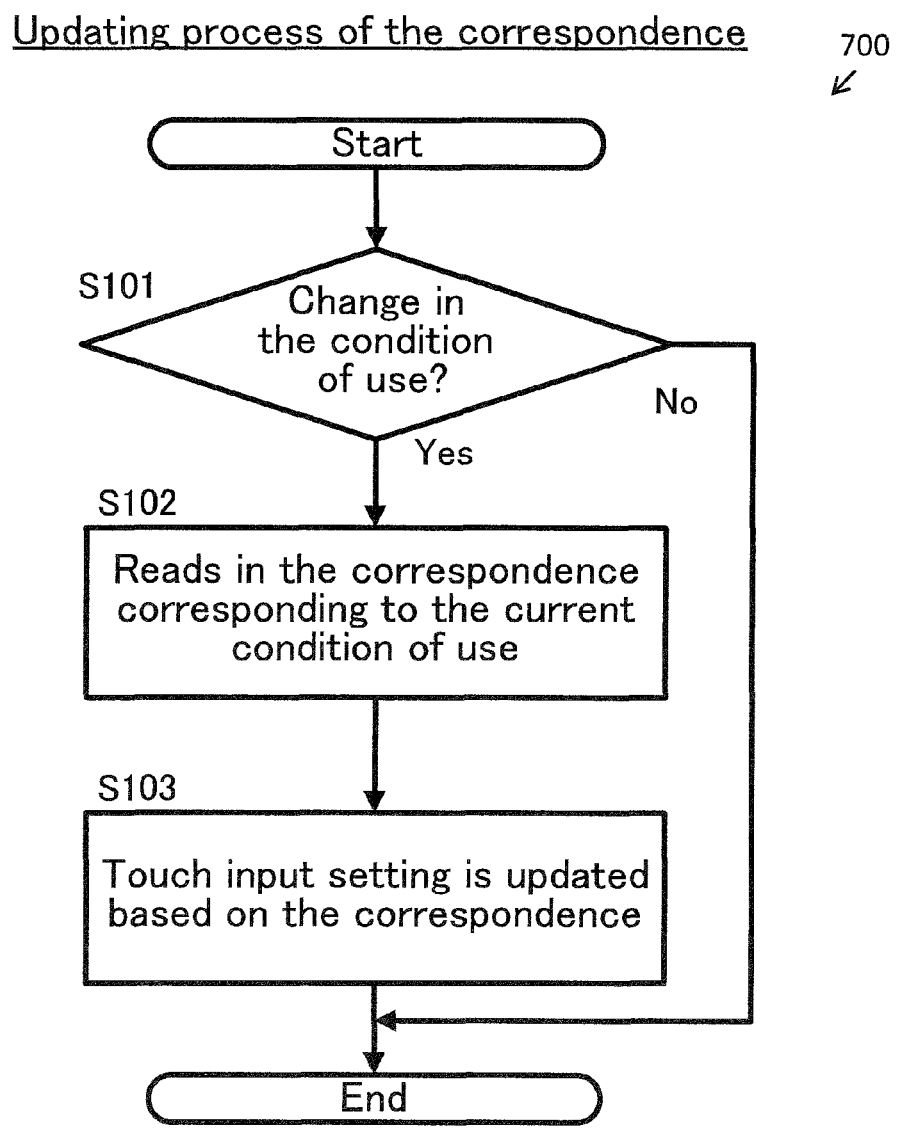
FIG. 7 is an illustration of a flowchart showing a processes for renewal of a correspondence according to an embodiment of the disclosure.

FIG. 7 is an illustration of a flowchart showing a processes 700 for renewal of a correspondence according to an embodiment of the disclosure.

Process 700 sets the correspondence in correspondence with the condition of use of the mobile phone 1

The processes of FIG. 7 are conducted when applications such as reading electronic documents, e-mail, viewing maps, and the like, are being used.

The various tasks performed in connection with the process 700 may be performed by software, hardware, firmware, a computer-readable medium having computer executable instructions for performing the process method, or any combination thereof. The process 700 may be recorded in a computer-readable medium such as a semiconductor memory, a magnetic disk, an optical disk, and the like, and can be accessed and executed, for example, by a computer CPU such as the CPU 100 in which the computer-readable medium is stored.

It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein. In practical embodiments, portions of the process 700 may be performed by different elements of the mobile phone 1 such as: the CPU 100, the memory 200, the first display 12, the first touch sensor 13, the first display surface 14, the first rear touch sensor 15, the second display 22, the second touch sensor 23, the second rear touch sensor 25, etc. Process 700 may have functions, material, and structures that are similar to the embodiments shown in FIGS. 1-6. Therefore common features, functions, and elements may not be redundantly described here.

In task S101, the CPU100 determines whether or not the condition of use of the mobile phone 1 (FIG. 5) has changed. If the condition of use changes (S101: YES), advances to the process of the following task S102. For example, if the user shifts the screen state from the open state to the closed state, the process of task S102 is conducted. If the condition of use does not change (S101: NO), the processes of FIG. 7 are simultaneously completed while restarting the processes of the flow chart. The processes are advanced from S101 to S102 upon startup of the abovementioned application.

In task S102, the CPU100 reads the correspondence corresponding with the condition of use after changing with reference to the correspondence defying table memorized in the memory 200. The correspondence defining table is a table that defines the correspondence of the touch sensors (13, 15, 23, and 25) with the display surface (14 and 24) in each condition of use of the mobile phone 1. Subsequently, based on the correspondence that has been read, setting of the correspondence of the touch sensors 13/15/23/25 with the display surface 14/24 is conducted (S103).

FIGS. 8A and 8B are tables showing a correspondence defining table according to an embodiment of the disclosure. FIG. 8A is a diagram showing the configuration of the correspondence defining table. FIG. 8B is a table showing each element of the correspondence defining table.

The valid ("◯" or "1") and invalid ("x") settings of the touch sensors 13/15/23/25 regarding each condition of use are defined in the correspondence defining table, as explained in FIG. 8B. "1" indicates that the subject of inputs to the first and second rear touch sensors 15 and 25 is accepted as inputs to the first display surface 14. In the present embodiment, inputs to the first rear touch sensor 15 are considered invalid.

According to FIG. 8A, inputs to the second rear touch sensor 25 in the closed state and the tilted state (I) are accepted as inputs to the first display surface 14. In the configuration example of FIG. 8, inputs to the first rear touch sensor 15 and the second rear touch sensor 25 in the open state and the tilted state (II) are considered invalid.

An example of the processes when inputs to the second rear touch sensor 25 are conducted in the closed state and the tilted state (I) is explained below.

For example, when the screen state transitions from the open state to the closed state or the tilted state (I) (S101:YES), the CPU100 reads the correspondence in the closed state or the tilted state (I) of the correspondence defining table of FIG. 8A from the memory 200 (S102). Subsequently, based on the definition of the read correspondence, the CPU100 conducts setting in order to correspond the inputs to the second rear touch sensor 25 with the inputs to the first display surface 14 in the closed state or the tilted state (I).

FIGS. 9A to 9C are diagrams showing a situation in which a mobile phone in a closed state is operated, and an exemplary display of an execution screen of an application according to an embodiment of the disclosure. FIG. 9A is a diagram showing a situation in which the mobile phone 1 in the closed state is held with a right hand of a user. FIGS. 9B and C are diagrams showing an example of the execution screen of the web browser. In FIGS. 9B and C, a screen 401 when a certain web page is opened is displayed on the first display surface 14.

The user touches the second rear touch sensor 25 with their right index finger as in FIG. 9A, slides it upwards from the user's side (direction of the white arrow), and may subsequently release the touched finger. If this operation is conducted when the screen of a web page is displayed on the first display surface 14 as in FIG. 9B, the CPU100 accepts the operation of this slide as inputs to the first display surface 14 in which the screen 401 is displayed. In this case, the slide is regarded as inputs in order to make the screen 401 scroll in the direction of the white arrow. As a result, the screen 401 of the web page is scrolled upwards, and as shown in FIG. 9C, the screen 401 of the web page following scrolling is displayed on the first display surface 14.

During this scrolling, inputs to the first display surface 14 are generally not conducted. Consequently, the user may see the entire screen 401 even when the operation for scrolling is conducted.

As indicated in FIGS. 9A and B, when the second rear touch sensor 25 is touched, the CPU100 displays an arrow-shaped pointer 402 at a location above the first display surface 14 corresponding to a display region of this touch location. The pointer 402 is smaller than the size of a fingertip so as not to hinder viewing of the first screen. When the touched finger is released, the CPU100 cancels the display of the pointer 402, as in FIG. 9C. The user may understand at which location on the first display surface 14 inputs are being conducted by confirming with his/her eyes the pointer 402 displayed on the first display surface 14. The pointer 402 moves in correspondence with the change in touch location of the second rear touch sensor 25.

The pointer 402 may take on other shapes besides the arrow shape. A configuration may be taken in which visibility of the execution screen of the application is given priority and the pointer is not displayed. The visibility of the pointer 402 may be given priority and a further larger pointer may be displayed.

Here, the sliding operation was explained; however, even when various inputs such as tapping, flicking, and the like, are conducted to the second rear touch sensor 25, the CPU100 regards inputs as having been conducted at the location to which the first display surface 14 corresponds. Subsequently, the CPU100 conducts processing based on the conducted process and the application in process.

Figure 10:
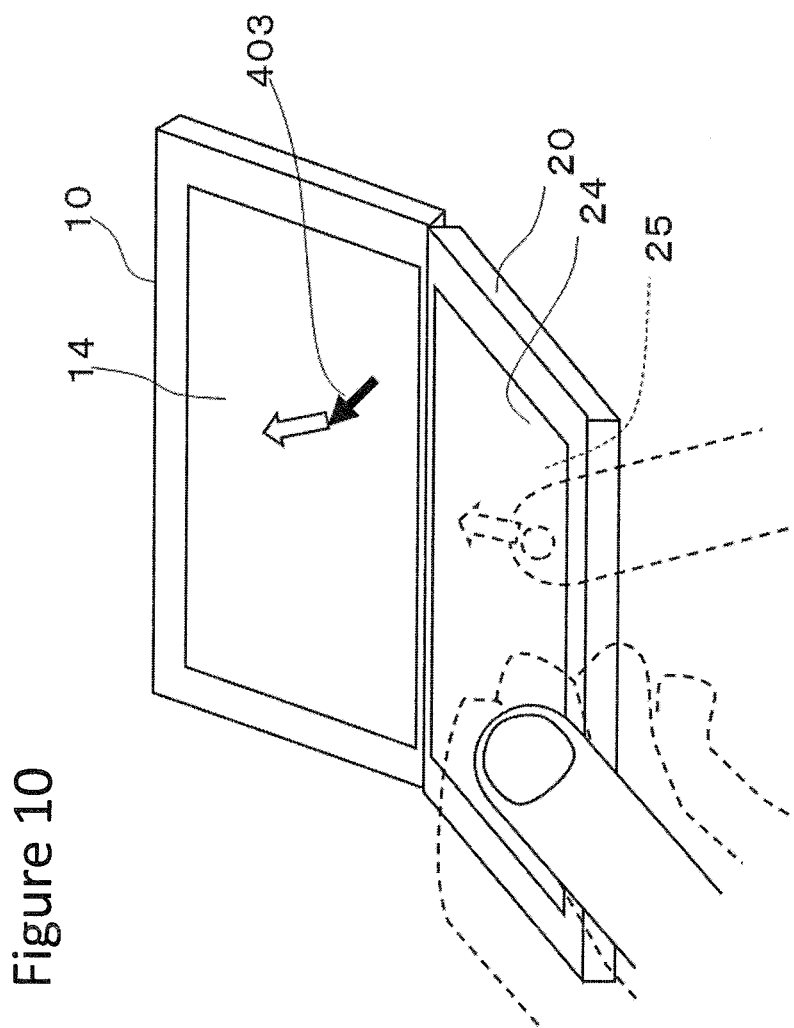
FIG. 10 is a diagram showing a situation in which a mobile phone in a tilted state (I) is operated according to an embodiment of the disclosure.

FIG. 10 is a diagram showing a situation in which the mobile phone 1 in a tilted state (I) is operated according to an embodiment of the disclosure. The mobile phone 1 in the tilted state (I) is held by the left hand and operated by the right hand. In FIG. 10, the right finger is touching the second rear touch sensor 25. As in FIG. 8A, inputs to the second rear touch sensor 25 in the tilted state (I) are accepted as inputs to the first display surface 14. The pointer 403 is displayed on the first display surface 14 corresponding to the touch location on the second rear touch sensor 25. For example, when sliding is conducted in the direction of the white arrow with broken lines and the touch location to the second rear touch sensor 25 is moved in the direction of the white arrow with broken lines, the pointer 403 moves in the direction of the white arrow with solid lines.

Figure 11A:
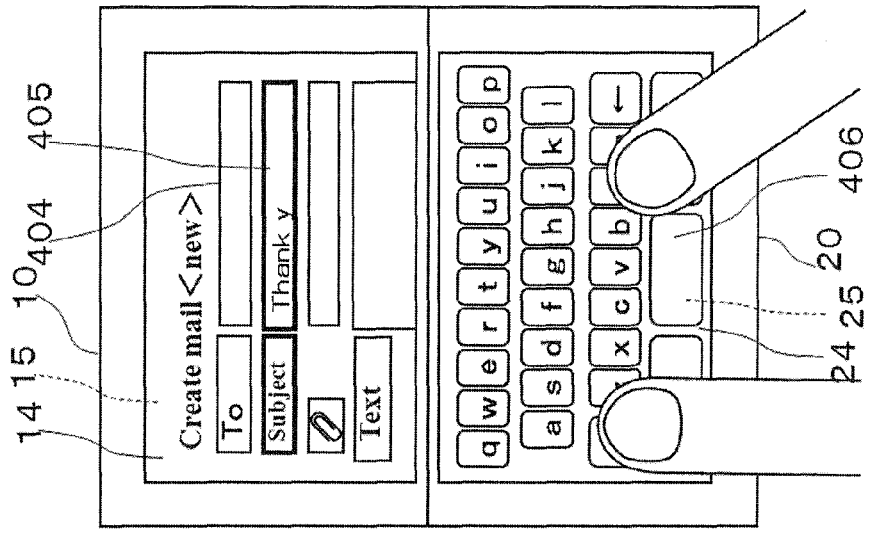
FIGS. 11A to 11C are diagrams showing an example of an execution screen of an application in a tilted state (I) operated according to an embodiment of the disclosure.
Figure 11B:
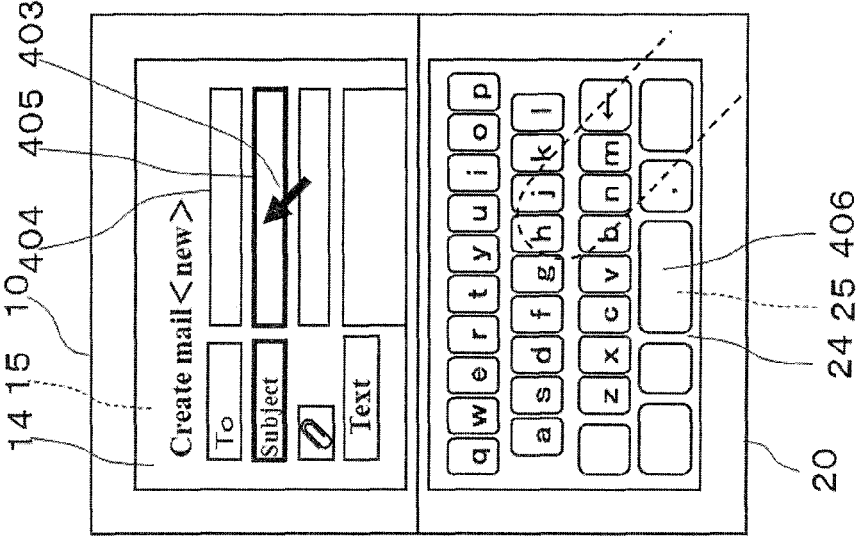
Figure 11C:
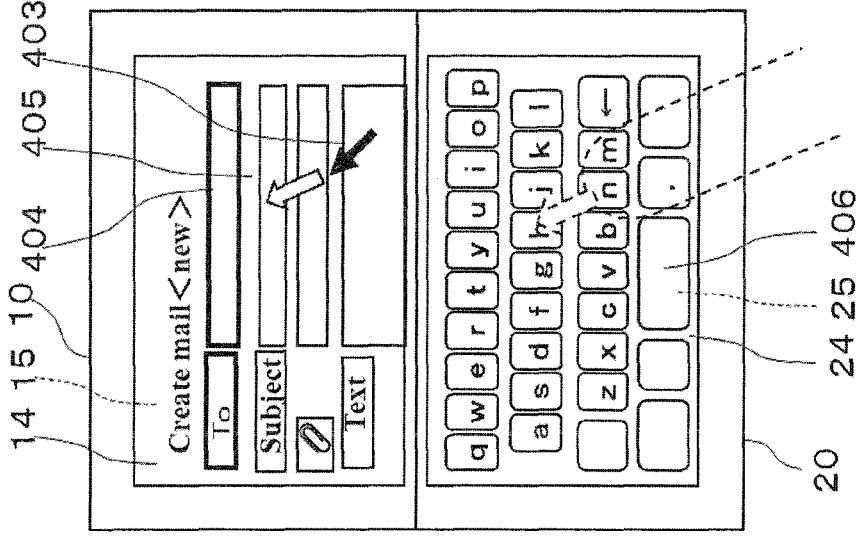

FIGS. 11A to 11C are diagrams showing an example of an execution screen of an application of an e-mail in a tilted state (I) operated according to an embodiment of the disclosure. FIGS. 11A to 11C shows, moving of the pointer 403 due to inputs to the second rear touch sensor 25 and validation of text inputs to the text inputting field in the location indicated by the pointer 403.

As illustrated, entry fields for the e-mail address of the recipient of the e-mail 404, entry field for the subject 405, and the like, are displayed on the first display surface 14 in addition to the pointer 403. In FIG. 11, a frame of the entry field 404 is highlighted, and currently, it may be observed that the entry field 404 is accepting text input. In FIGS. 11B and C, a frame of the entry field 405 is respectively highlighted, making text input to the entry field 405 possible.

A soft keyboard 406 for inputting texts is displayed on the second display surface 24. Texts corresponding to a touched soft key are displayed on the text inputting field that is ready to accept text inputs by images of each soft key on the soft keyboard 406 being touched with fingers, and the like. (refer to the finger image of FIG. 11C).

In FIG. 11A, currently, the pointer 403 is displayed lower than the entry field of the subject 405 based on the location of touch (refer to the finger drawn with dotted lines) on the current second rear touch sensor 25. When the user slides the touched finger in the direction of the white arrow with broken lines (upper left), the pointer 403 also moves in the same direction. Thereby, the pointer 403 points to the entry field of the subject 405, as shown in FIG. 11B.

When, in this state, the fingers are released from the second rear touch sensor 25 and tapping is further conducted at the touch location, the CPU 100 highlights the frame of the entry field of the subject 405, making the acceptance of inputs to the entry field 405 possible. If the keys of the soft keyboard 406 are pushed under this condition, the CPU 100 displays the keys corresponding to the pushed keys to the entry field 405, as illustrated in FIG. 11C.

In this manner, in the tilted state (I), inputs to the second rear touch sensor 25 are accepted as inputs to the first display surface 14.

Figure 12B:
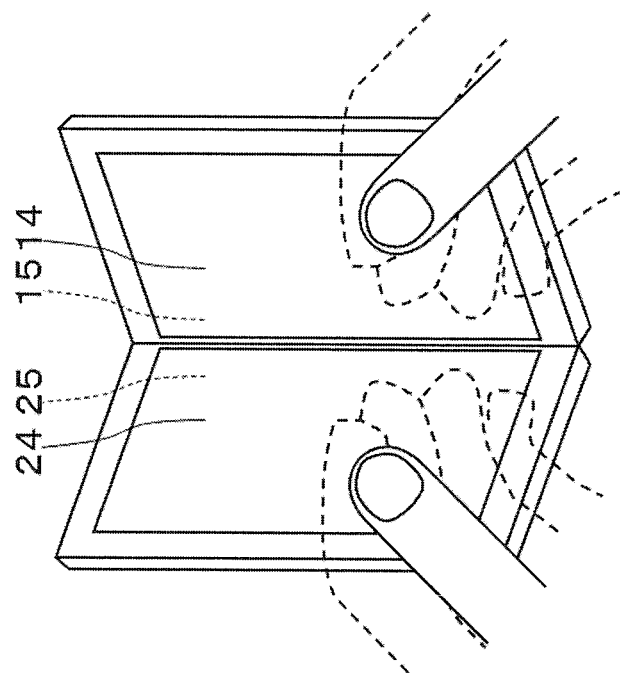
FIGS. 12A and 12B are diagrams showing a situation in which a mobile phone in an open state (II) and a tilted state (II) is operated according to an embodiment of the disclosure.
Figure 12A:
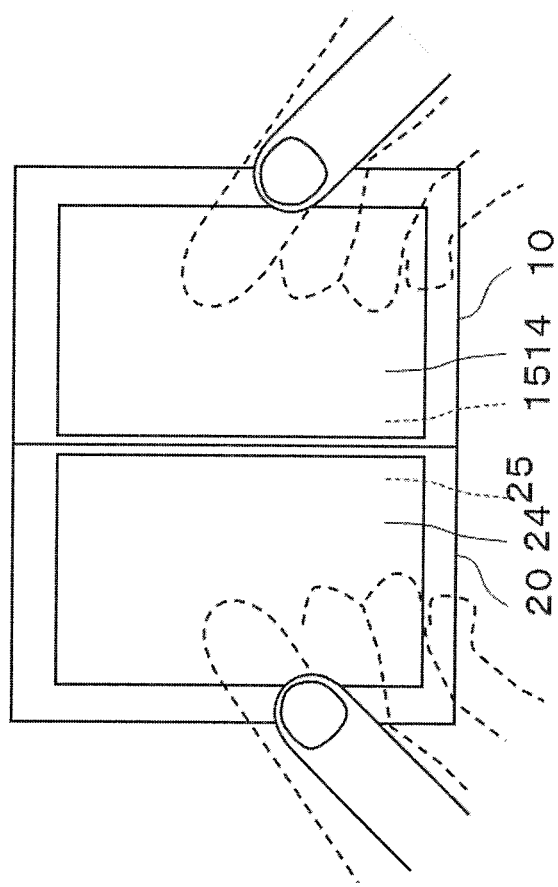

As shown in FIG. 8, in the open state and tilted state (II), inputs to the first and second rear touch sensors 15 and 25 are considered invalid. Consequently, even when a finger of the user contacts the first or second rear touch sensor 15 and 25 in this open state and tilted state (II), this contact does not affect the content of the execution, as shown in FIGS. 12A and B.

As mentioned above, according to the mobile phone 1 related to the present embodiment, when the condition of use of the mobile phone 1 changes, inputs to the first and second rear touch sensors 15 and 25 are associated with inputs to the first or second display surfaces 14 and 24, based on the correspondence defining table and the current condition of use.

In the closed state, inputs to the second rear touch sensor 25 are associated with inputs to the first display surface 14. Accordingly, the user may conduct the desired operation by inputs to the second touch sensor 23 without hindering the screen displayed on the first display surface 14 (FIG. 9).

In the tilted state (I), inputs to the second rear touch sensor 25 are associated with inputs to the first display surface 14. The user may conduct inputs to the first display surface 14 without finger touching the unstable first cabinet 10, which is rotatable with little force, by inputs to the second rear touch sensor 25 (touching, sliding, tapping).

Meanwhile, in the open state and the tilted state (II), inputs to the first and second rear touch sensors 15 and 25 are considered invalid. Therefore, even when the finger touches the back surface of the mobile phone 1 in any manner, this finger contact does not affect the execution of the application. Therefore, as in FIG. 12, the user may stably hold the mobile phone 1 with both hands.

In this manner, operation procedures of the application by the rear touch sensors 15 and 25 are appropriately switched over based on the predetermined correspondence in accordance with the condition of use of the mobile phone; therefore, the user may conduct operations for using the application by effectively making use of the rear touch sensor.

Embodiment 2

In the embodiment mentioned above, correspondence is set based on one correspondence defining table (FIG. 8) regardless of the conducted application. In contrast, in Embodiment 2, a plurality of correspondence defining tables are associated with the application and memorized to the memory 200. In the present embodiment, the correspondence read in order to set the correspondence differs depending on the application in process.

Figure 13:
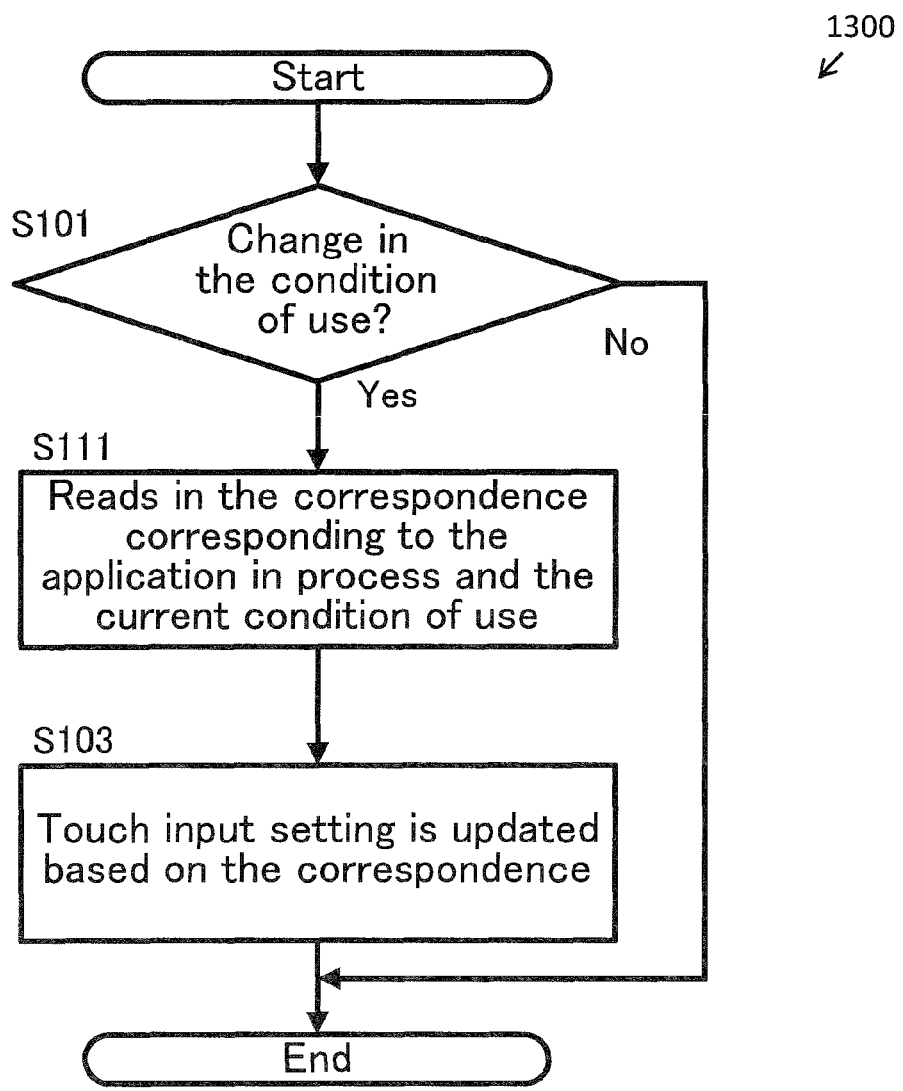
FIG. 13 is a flowchart showing a control process according to an embodiment of the disclosure.

FIG. 13 is a flowchart showing a control process 1300 according to an embodiment of the disclosure. The various tasks performed in connection with the process 1300 may be performed by software, hardware, firmware, a computer-readable medium having computer executable instructions for performing the process method, or any combination thereof. The process 1300 may be recorded in a computer-readable medium such as a semiconductor memory, a magnetic disk, an optical disk, and the like, and can be accessed and executed, for example, by a computer CPU such as the CPU 100 in which the computer-readable medium is stored.

It should be appreciated that process 1300 may include any number of additional or alternative tasks, the tasks shown in FIG. 13 need not be performed in the illustrated order, and process 1300 may be incorporated into a more comprehensive procedure or process having additional functionality not described in detail herein. In practical embodiments, portions of the process 1300 may be performed by different elements of the mobile phone 1 such as: the CPU 100, the memory 200, the first display 12, the first touch sensor 13, the first display surface 14, the first rear touch sensor 15, the second display 22, the second touch sensor 23, the second rear touch sensor 25, etc. Process 400 may have functions, material, and structures that are similar to the embodiments shown in FIGS. 1-12. Therefore common features, functions, and elements may not be redundantly described here.

In the process 1300 task S102 in FIG. 7 is replaced with the process of task S111. In task S111, the CPU 100 reads the correspondence according to the current condition of use with reference to the correspondence defining table associated with the application currently in process.

If the correspondence defining table associated with the application in process is not stored in the memory 200, the CPU 100 uses the correspondence defining table for general purposes as a reference. The correspondence defining table for general purposes is, for example, the correspondence defining table shown in FIG. 8A, which is stored by the memory 200 in advance.

An example of the correspondence defining table associated with individual applications and examples of the application is explained below.

Figures 14A, 14B, 14C:
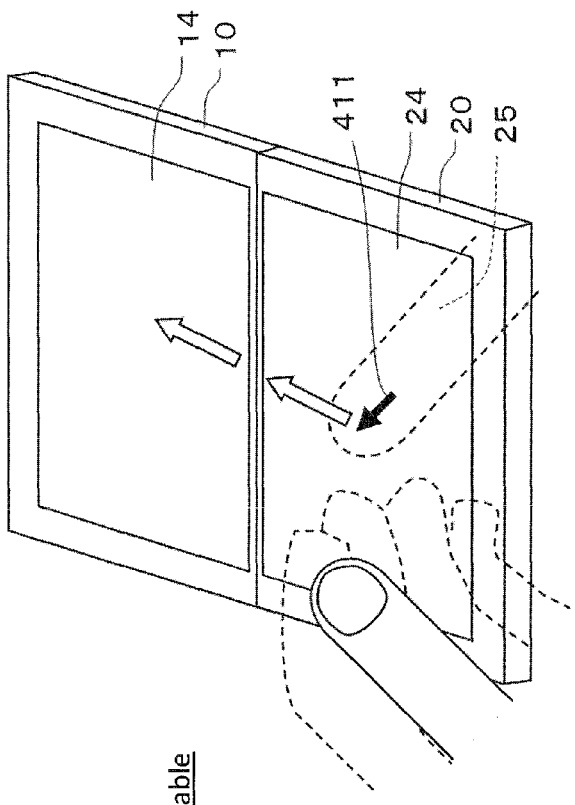
FIGS. 14A to 14C are tables showing an example of a correspondence defining table and a diagram showing a situation in which the mobile phone 1 in an open state (I) is operated according to an embodiment of the disclosure.

FIGS. 14A to 14C are tables showing an example of a correspondence defining table and a diagram showing a situation in which the mobile phone 1 in an open state (I) is operated according to an embodiment of the disclosure. FIG. 14A is the correspondence defining table associated with the application for viewing maps. FIG. 14B is a table explaining each element of the correspondence defining table of FIG. 14A. The correspondence defining table of FIG. 14A is corresponded with a different input regarding inputs to the first and second rear touch sensors 15 and 25 in the open state when compared to the correspondence defining table of FIG. 8A. As shown in FIGS. 14A and 14B, according to this correspondence defining table, inputs to the first and second rear touch sensors 15 and 25 are accepted as inputs to the first and second display surfaces 14 and 24, respectively.

FIG. 14C is a diagram showing a situation in which the mobile phone 1 in the open state is held by a left hand of a user and inputs are made to the second rear touch sensor 25 using fingers of a right hand of the user. When an application for viewing maps is in process, inputs (slide) as shown with the two arrows in FIG. 14C may be accepted.

That is to say, first, when a finger of the user touches the second rear touch sensor 25, a pointer 411 is displayed at a location above the first display surface 14 corresponding with the location of this touch. When sliding the touched finger in the direction of the white arrow, the user first conducts a sliding operation on the second rear touch sensor 25, advancing the finger to the first rear touch sensor 15 even after reaching the border of the second rear touch sensor 25, and may conduct a sliding operation on the first rear touch sensor 15. These sliding operations are accepted as inputs to the first and second display surfaces 14 and 24.

Figure 15B:
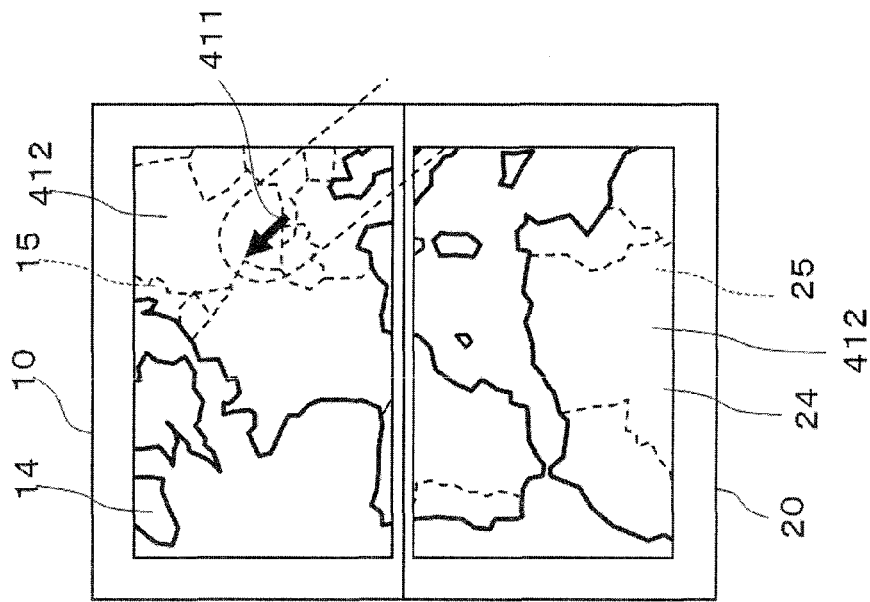
FIGS. 15A and 15B are diagrams showing a display example of an execution screen of an application in an open state (I) according to an embodiment of the disclosure.
Figure 15A:
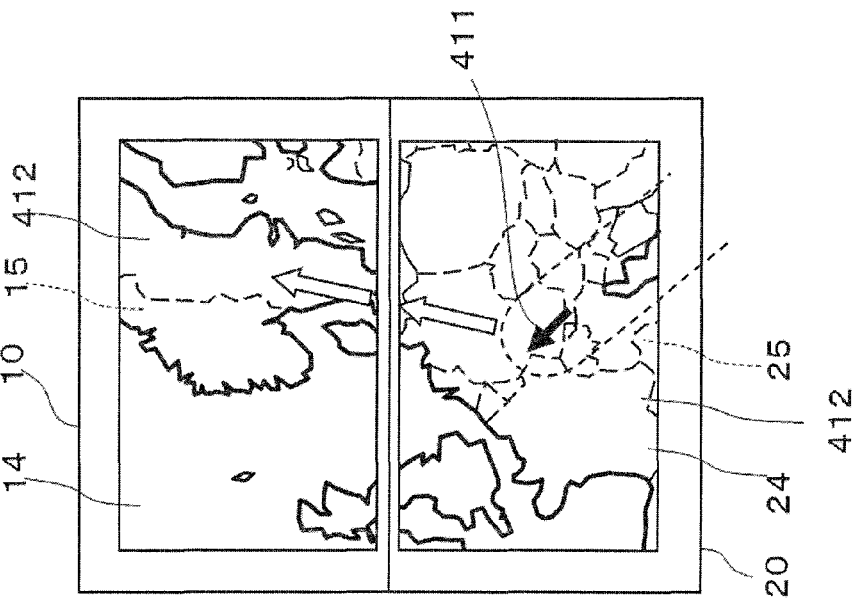

FIGS. 15A and 15B are diagrams showing a display example of an execution screen of an application in an open state (I) according to an embodiment of the disclosure. FIGS. 15A and B show an execution screen of an application for viewing maps when the sliding operation mentioned above is conducted. A map 412 is composed of the two screens displayed on the first and second display surfaces 14 and 24; however, because the interval between the first display surface 14 and the second display surface 24 is narrow, the user may view these two images as one map 412.

When the sliding operation mentioned above is conducted while the pointer 411 is displayed on the second display surface 24, the CPU100 moves the pointer 411 in correspondence with the sliding operation. The CPU100 conforms to the transition of the pointer 411 and scrolls the map 412. As a result, as shown in FIG. 15B, the pointer 411 moves to the first display surface 14 simultaneously with the point indicated when the pointer 411 in FIG. 15A is moved to the location indicated by the pointer 411 in FIG. 15B.

Inputs to the first display surface 14 are not carried out during scrolling of this map 412. Therefore, the user may see the entire map 412 displayed on the first display surface 14 even while scrolling the map 412.

Figures 16A, 16B:
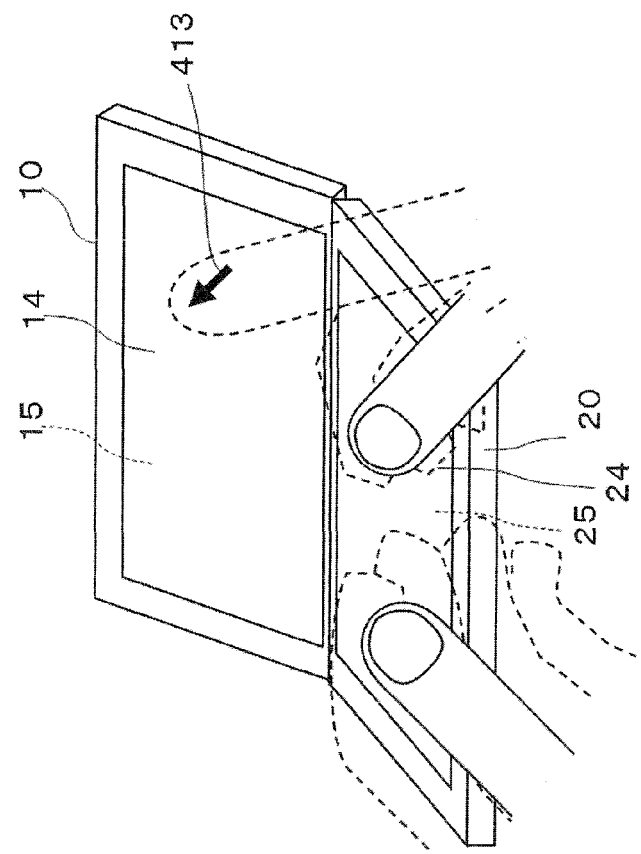
FIGS. 16A and 16B are illustrations of a table showing an example of a correspondence defining table and a diagram showing a situation in which a mobile phone in a tilted state (I) is operated according to an embodiment of the disclosure.

FIGS. 16A and 16B are illustrations of a table showing an example of a correspondence defining table and a diagram showing a situation in which the mobile phone 1 in a tilted state (I) is operated according to an embodiment of the disclosure. FIG. 16A is the correspondence defining table associated with the application for using e-mail. The correspondence defining table of FIG. 16A has different correspondence in the tilted state (I) compared to the correspondence defining table of FIG. 14A. That is to say, in the tilted state (I), inputs to the first rear touch sensor 15 are accepted as inputs to the first display surface 14, while inputs to the second rear touch sensor 25 are considered invalid.

FIG. 16B is a diagram showing a situation in which the mobile phone 1 in the tilted state (II) is held with both hands and inputs to the first rear touch sensor 15 are conducted with a right index finger. Based on these inputs, a pointer 13 is displayed at a predetermined position of the first display surface 14.

FIGS. 17A to 17C are diagrams showing a display example of an execution screen of an application in a tilted state (I) according to an embodiment of the disclosure. FIGS. 17A to C correspond to FIGS. 11A to C, respectively. However, in this example, inputs to the first display surface 14 are conducted via the first rear touch sensor 15, not the second rear touch sensor 25.

In FIG. 17A, a pointer 413 is displayed lower than an entry field for a subject 405 based on a touch location on a current second rear touch sensor 25. The user may move the pointer 413 in the direction of a white arrow in FIG. 17A by changing the input location to the first rear touch sensor 15. As in FIG. 17B, when tapping is conducted in the touch location when the pointer 413 indicates the entry field for the subject 404, the CPU100 highlights a frame of the entry field for the subject 405. Thereby, text inputs to the entry field 405 may be accepted.

When the key of the soft keyboard 406 is pushed under this condition, the CPU100 displays the texts corresponding to the pushed keys on the entry field for the subject 405, as illustrated in FIG. 17C.

In this manner, in the tilted state (I), inputs to the first rear touch sensor 15 are accepted as inputs to the first display surface 14.

Depending on the application, there are times when it is more desirable that inputs to a region with the first rear touch sensor 15 or the second rear touch sensor 25 (hereinafter, referred to as "invalid region") be considered invalid even when the first rear touch sensor 15 or the second rear touch sensor 25 are considered valid. The invalid region is set as a region in which input errors by the user are prone to occur. In this case, information in order to set the invalid region is comprised in the correspondence defining table.

FIG. 18A is the correspondence defining table associated with the application for viewing electronic books. In the correspondence defining table of FIG. 18A, inputs to the first rear touch sensor 15 and the second rear touch sensor 25 in the tilted state (II) are considered valid to the correspondence defining table of FIG. 8A. In the tilted state (II), the invalid region is set in the first rear touch sensor 15 and the second rear touch sensor 25.

FIG. 18B is a diagram showing a coordinate system of the screen displayed on the first display surface 14 and the second display surface 24. A screen size of the first display surface 14 and the second display surface 24 mat be, for example, 480 pixels×800 pixels. As shown in FIG. 18B, an origin of a coordinate axis of each display surface is an upper left (0, 0), while a coordinates of a lower right are (480, 800), respectively.

The invalid regions 414 and 415, which are defined in FIG. 18A, are mentioned using the coordinate axis of FIG. 18B. A display of "1: (0, 480) to (480, 480)" in the correspondence defining table of FIG. 18A are coordinates comprised on the first display surface 14, which shows that inputs to the rectangular region 414 (the region with diagonal lines) with opposing vertex coordinates (0, 480) and (480, 800) are invalid. In the same manner, a display of "2: (0, 480) to (480, 480)" are coordinates comprised on the second display surface 24, which shows that inputs to the rectangular region 415 with the opposing vertex coordinates of (0, 480) and (480, 800) are invalid. In the tilted state (II), the region corresponding to a substantially square region defined by the (0, 0) and (480, 480) of the first rear touch sensor and the second rear touch sensor 25 is considered the valid region, and inputs to the valid region are accepted.

The size of the invalid region may be set larger in order to reduce operational errors, or may be set smaller in order to make operations at the rear touch sensor 1 smoother. The invalid region may be set at a different location than the example mentioned above according to purposes, and the like.

FIG. 18C exemplarily shows the situation in which the mobile phone 1 in the tilted state (II) is held by both hands. The middle finger, fourth finger, and little finger of both left and right hands contact the invalid regions 414 and 415 of the first or the second rear touch sensors 15 and 25. Therefore, when the mobile phone 1 is held as in FIG. 18C, inputs to the invalid regions 414 and 145 of the middle finger, fourth finger, and little finger are considered invalid. In contrast, when the index finger of both left and right hands each touch the valid region, the CPU100 accepts the inputs by this touch as inputs to the first display surface 14 or the second display surface 24. In this case, as shown in FIG. 18C, pointers 416 and 147 are displayed at the location of the first display surface and the second display surface 24 based on the touch location.

The user may operate the application for viewing electronic books by conducting inputs to the first rear touch sensor or the second rear touch sensor 25 in this manner. For example, the user may turn pages by sliding the index finger of the right hand along the first rear touch sensor 15.

FIGS. 19A and B are diagrams showing an execution screen of an application for viewing electronic books when the sliding operation is conducted. In FIGS. 19A and B, an image of the electronic book is displayed on the first and second display surfaces 14 and 24. In FIGS. 19A and B, the invalid regions 414 and 415 are only illustrated for reference, while in actuality, the invalid regions 414 and 415 are not required to be displayed as images. The current page number "33" and "34" as well as the total page number of the currently opened electronic book "189" are displayed on a page number displaying section in the upper right of the first display surface 14 and the second display surface 24.

When the index finger of the right hand is slid in the left direction of the valid region, as in the white arrow (direction of the white arrow in FIG. 19A), the CPU100 receives this sliding operation as inputs to the first display surface 14, and determines this operation as the operation for turning pages. As a result, the CPU100 displays images of the following page, as shown in FIG. 19B. That is to say, the images of pages 35 and 36 are displayed on the first display surface 14 and the second display surface 24.

The user may turn pages with the fingers by the sliding operation to the first rear touch sensor 15 without blocking the images displayed on the first display surface 14 and the second display surface 24.

When the direction of sliding is to the opposite side, processes are conducted so that the image of the preceding pages (pages 31 and 32) is displayed on the display surface. In the example mentioned above, inputs to the first rear touch sensor 15 were also explained; however, the same process is also conducted when the sliding operation is conducted to the second rear touch sensor 25. The CPU100 accepts inputs for conducting a variety of processes such as expansion and contraction of texts, bookmarks, and the like, by predetermined processes to the first rear touch sensor 15 and the second rear touch sensor 25 in addition to processes for turning pages.

As mentioned above, the correspondence defining table is associated with the application according to the present embodiment; therefore, inputs to the first rear touch sensor 15 and the second rear touch sensor 25 may be adaptively corresponded with inputs to the first display or the second display surface 24 in correspondence with the current application in process, not only by the current condition of use of the mobile phone 1. That is to say, different correspondences are set depending on the application in correspondence with individual characteristics of each application; thereby, allowing the user to more effectively use the rear touch sensors 15 and 25.

In the present embodiment, the invalid region that does not accept operational inputs to the first rear touch sensor or the second rear touch sensor 25 is set; thereby, allowing input errors to the application to be controlled. For example, in the application for viewing electronic books, the user may hold the mobile phone 1 in a more stable manner and reduce operational errors to the rear touch sensor by touching the invalid region with the finger.

Embodiment 3

Embodiment 3 is configured such that the user may further change the correspondence defining table in addition to the configuration of Embodiment 1.

The CPU100 conducts correspondence changing processing in order to accept changes in the correspondence defining table. The user selects the setting icon (not illustrated) for setting the operation of the mobile phone 1 displayed on a home screen, a launcher screen, and the like, displays the menu for selecting the content of settings, and in this menu, selects an item in order to conduct correspondence changing processing, allowing for conducting of correspondence changing processing.

Figure 20B:
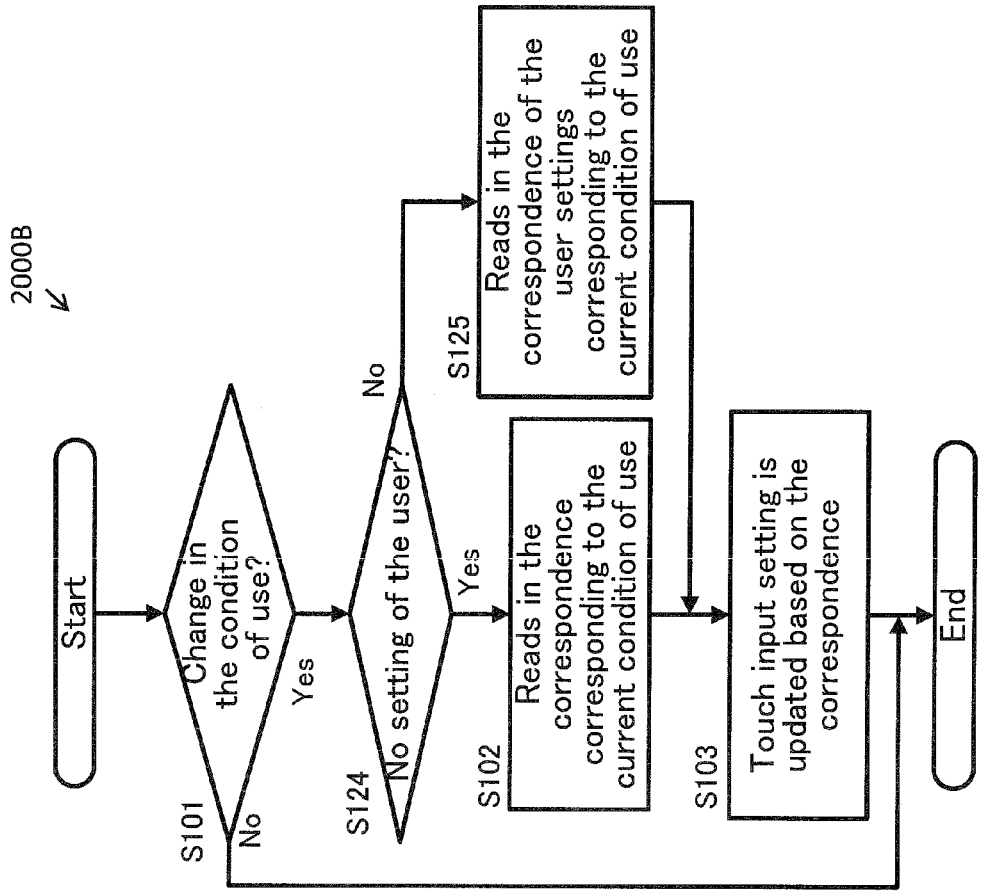
FIGS. 20A and 20B are illustration of flowcharts showing a process for correspondence changing and a process for correspondence updating according to embodiments of the disclosure.
Figure 20A:
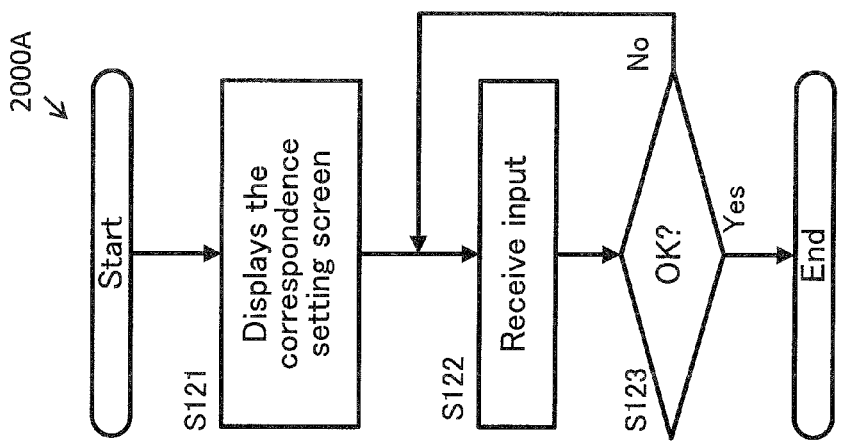

FIGS. 20A and 20B are illustration of flowcharts showing processes 2000A and 2000B for correspondence changing and a process for correspondence updating respectively according to embodiments of the disclosure. The various tasks performed in connection with the processes 2000A and 2000B may be performed by software, hardware, firmware, a computer-readable medium having computer executable instructions for performing the process method, or any combination thereof. The processes 2000A and 2000B may be recorded in a computer-readable medium such as a semiconductor memory, a magnetic disk, an optical disk, and the like, and can be accessed and executed, for example, by a computer CPU such as the CPU 100 in which the computer-readable medium is stored.

It should be appreciated that processes 2000A and 2000B may include any number of additional or alternative tasks, the tasks shown in FIGS. 20A and 20B need not be performed in the illustrated order, and processes 2000A and 2000B may be incorporated into a more comprehensive procedure or process having additional functionality not described in detail herein. In practical embodiments, portions of the processes 2000A and 2000B may be performed by different elements of the mobile phone 1 such as the CPU 100, the memory 200, the first display 12, the first touch sensor 13, the first display surface 14, the first rear touch sensor 15, the second display 22, the second touch sensor 23, the second rear touch sensor 25, etc. Process 400 may have functions, material, and structures that are similar to the embodiments shown in FIGS. 1-19. Therefore common features, functions, and elements may not be redundantly described here.

FIG. 20A is a flowchart showing correspondence changing processing. When correspondence changing processing is conducted, the CPU100 displays a screen for setting the correspondence (S121) and accepts inputs in order to change the setting (S122). In task S122, the user may set the valid/invalid of the first touch sensor 13 and the second touch sensor 23, the valid/invalid of the first rear touch sensor 15 and the second rear touch sensor 25, setting of the subject for operation (first display surface 14 or the second display surface 24) when the first rear touch sensor 15 and the second rear touch sensor 25 are set effectively, the invalid region when the first and second rear touch sensors 15 and 25 are set effectively, and the like.

In task (S123) for confirming inputs by the user, if the user selects OK (S123: YES), the correspondence defining table in correspondence with the content of setting is stored in the memory 200, and the processes of FIG. 20A are completed. Thereby, the correspondence defining table set by the user is prepared together with the correspondence defining table (default) of FIG. 8. If OK is not selected in task S123 (S123: NO), an input accepting process of the task S122 is continued. If cancel is input by the user on the screen for setting correspondence, correspondence changing processing terminates.

FIG. 20B is a flowchart showing a control process 2000B. In the process 2000B, the processes of tasks S124 and S125 are added to the flowchart of FIG. 7. When the condition of use changes (S101: YES), the CPU100 determines that the correspondence defining table is not changed by the user (S124). If the correspondence defining table is not changed (S124: YES), the CPU100 reads the correspondence corresponding with the current condition of use from the correspondence defining table of FIG. 8A (S102). Meanwhile, if there is change in the correspondence defining table (S124: NO), the CPU100 reads the correspondence corresponding with the current condition of use from the changed correspondence defining table. The CPU100 conducts setting of the correspondence with the touch sensors 13/15/23/25 and the display surface 14/24 based on the read correspondence (S103).

The user may, for example, change the correspondence defining table of FIG. 8A to the correspondence defining table of FIG. 18A. For example, by using the changed correspondence table when running the application for viewing electronic books, the user may hold the mobile phone 1 in a more stable manner by touching the invalid region with the finger as mentioned above and reduce operational errors in the rear touch sensors 15 and 25.

In this manner, operations of the application may be conducted in a way desired by the user; therefore, the first and second rear touch sensors 15 and 25 may be further effectively used.

Embodiment 4

In the present embodiment, the correspondence defining table is prepared per application and the content of these correspondence defining tables may be individually changed by the user. That is to say, the configuration of Embodiment 3 is added to the configuration of Embodiment 2. Correspondence changing processing per application is conducted in the same manner as in FIG. 20A. However, in the present embodiment, the application subject for change is selected by the user in correspondence changing processing.

Figure 21:
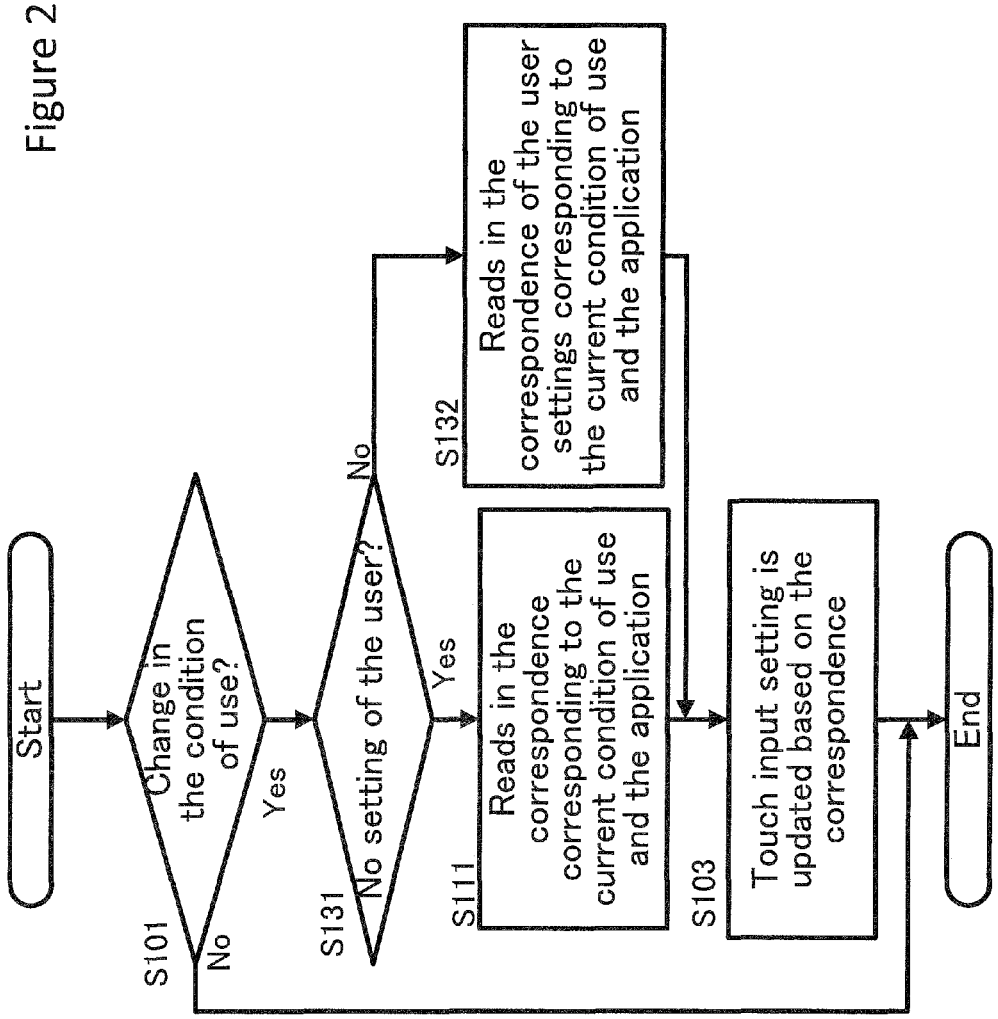
FIG. 21 is a flowchart showing a control processing according to an embodiment of the disclosure.

FIG. 21 is a flowchart showing a control process 2100 according to an embodiment of the disclosure. The various tasks performed in connection with the process 2100 may be performed by software, hardware, firmware, a computer-readable medium having computer executable instructions for performing the process method, or any combination thereof. The process 2100 may be recorded in a computer-readable medium such as a semiconductor memory, a magnetic disk, an optical disk, and the like, and can be accessed and executed, for example, by a computer CPU such as the CPU 100 in which the computer-readable medium is stored.

It should be appreciated that process 2100 may include any number of additional or alternative tasks, the tasks shown in FIG. 21 need not be performed in the illustrated order, and process 2100 may be incorporated into a more comprehensive procedure or process having additional functionality not described in detail herein. In practical embodiments, portions of the process 2100 may be performed by different elements of the mobile phone 1 such as: the CPU 100, the memory 200, the first display 12, the first touch sensor 13, the first display surface 14, the first rear touch sensor 15, the second display 22, the second touch sensor 23, the second rear touch sensor 25, etc. Process 400 may have functions, material, and structures that are similar to the embodiments shown in FIGS. 1-20. Therefore common features, functions, and elements may not be redundantly described here.

In the process 2100, the processes of tasks S131 and S132 are added to the flow chart of FIG. 13.

In task S131, whether the correspondence defining table corresponding to the current application in process is changed by the user or not is determined. If the correspondence defining table is not changed (S131: YES), processes are conducted using the default correspondence table (S111, S103). If the correspondence defining table is changed (S131: YES), processes are conducted using the changed correspondence table (S132, S103).

Figures 22A, 22B:
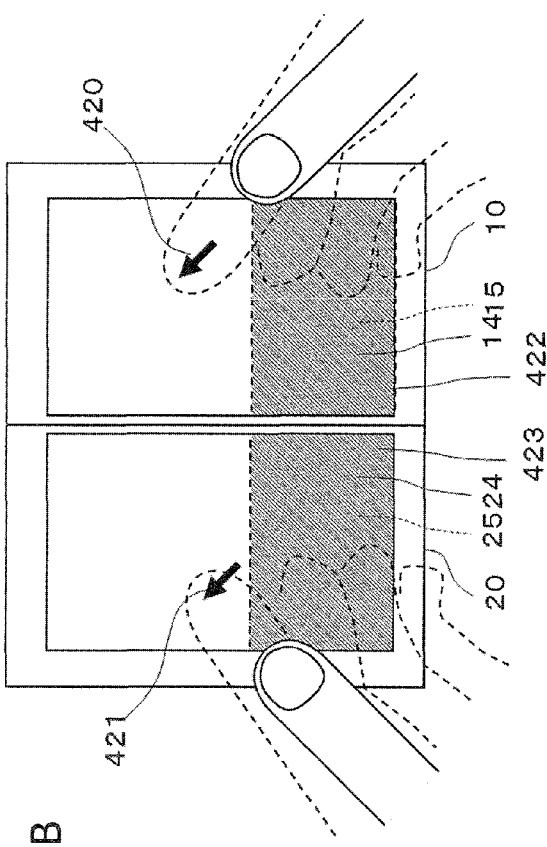
FIGS. 22A and 22B illustrate a table showing an example of a correspondence defining table and a diagram showing a situation in which a mobile phone is operated in a closed state (II) according to an embodiment of the disclosure.

In the present embodiment, the user may, for example, change the correspondence defining table of the e-mail application of FIG. 16A to the correspondence defining table of FIG. 22A. Regarding the correspondence defining table of FIG. 22A, the open state is divided into the open state (I) and the open state (II) to FIG. 16A (refer to FIG. 5), and the setting in the tilted state (II) is changed. In concrete terms, the setting in the open state (I) is the same as the setting in the open state of the correspondence defining table of FIG. 16A, while the setting in the open state (II) and tilted state (II) is the same as the setting in the tilted state (II) of the correspondence defining table of FIG. 18A. The invalid region is set in the correspondence defining table of FIG. 22A.

If the correspondence table is changed in this manner and the mobile phone 1 in the open state (II) is held with both hands as in FIG. 22B, the index finger of both the left and right hands each touch the valid region of the first or second rear touch sensor 15 and 25, while the middle finger, fourth finger, as well as the little finger contact the invalid regions 422 and 423 of the first or second rear touch sensor 15 and 25. The user may operate the e-mail application by conducting inputs to the valid region of the first or second rear touch sensor 15 and 25 with the index finger.

Figure 23A:
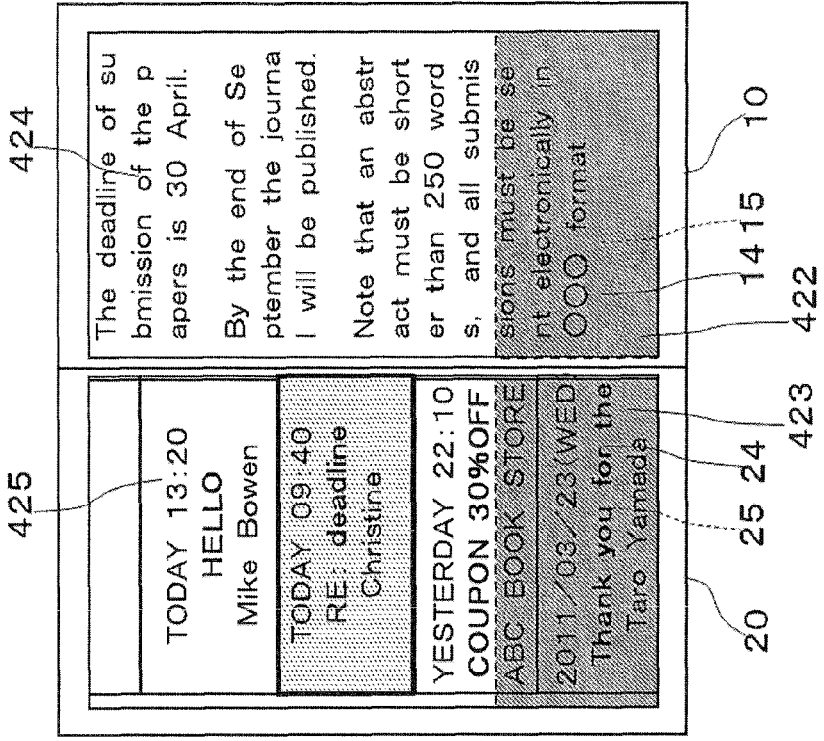
FIGS. 23A and 23B are diagrams showing a display example of an execution screen of an application in an open state (II) according to an embodiment of the disclosure.
Figure 23B:
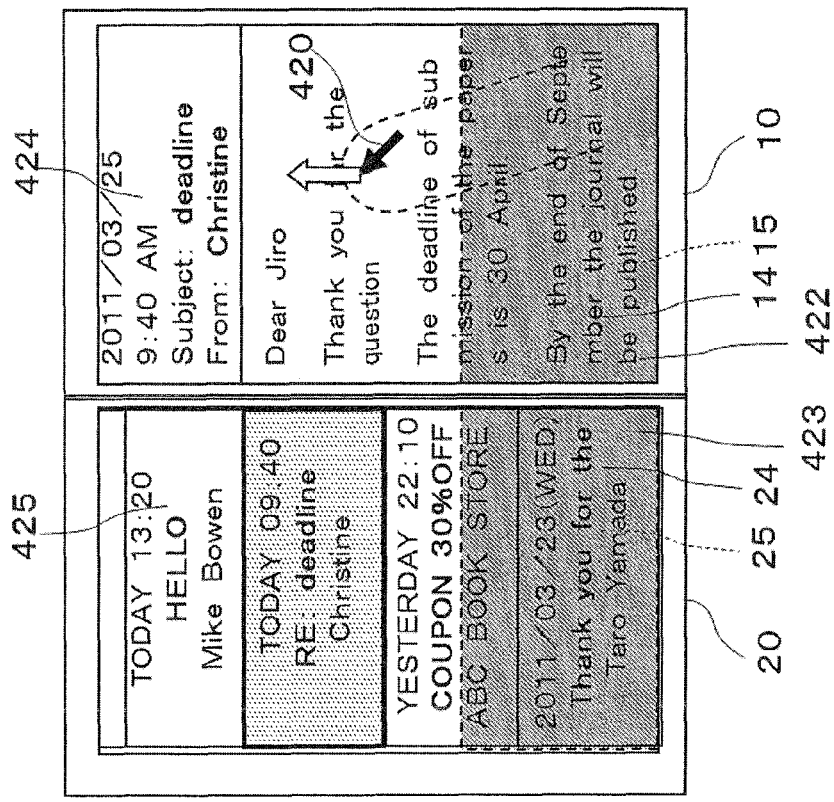

FIGS. 23A and 23B are diagrams showing a display example of an execution screen of an e-mail application in an open state (II) related to Embodiment 4. In FIGS. 23A and B, a screen 424 of the text of e-mails received by the mobile phone 1 is displayed on the first display surface 14, while a screen 425 of a list of e-mails received by the mobile phone 1 is displayed on the second display surface 24.

The user may scroll the screen 424 of the text of e-mails upwards by sliding upwards the finger touching the valid region of the first rear touch sensor 15, as shown by the white arrow of FIG. 23A. As a result, the image 424 of the text of received e-mails scrolled upwards (direction of the white arrow) is displayed on the first display surface 14, as shown in FIG. 23B.

The CPU100 conducts the same process even when inputs are conducted to the valid region of the second rear touch sensor 25. For example, the CPU100 scrolls the screen 425 of a list of received e-mails on the second display surface 24 by the sliding operation to the valid region of the second rear touch sensor 25.

The correspondence defining table of the e-mail application may be appropriately changed regarding contents other than FIG. 22A. FIGS. 24A and B are images showing other examples of changes. The user may change the once changed correspondence defining table again by the changing process mentioned above.

In the correspondence defining table of FIG. 24A, the open state is not divided into the open states (I) and (II), and the content of setting in the open state is different in contrast to FIG. 22A. Inputs to the first and second rear touch sensors 15 and 25 are respectively processed by the CPU 100 as inputs to the first display surface and the second display surface 24.

The correspondence defining table of FIG. 24B has a different content for setting in the tilted state (I) in contrast to FIG. 24A. In the tilted state (I), inputs to the first rear touch sensor 15 are considered invalid, while inputs to the second rear touch sensor 25 are considered valid. Inputs to the second rear touch sensor 25 are processed by the CPU 100 as inputs to the first display surface 14.

In this manner, the user may set the correspondence defining table per application according to preferences. According to the present embodiment, operations adjusted to the characteristics of operations may be conducted with a setting content desired by the user, further improving the operability.

Others

In the above, the embodiment related to the present invention was explained; however, the present invention is not in any way limited by the abovementioned embodiment. Various changes other than those mentioned above are possible regarding the embodiment of the present invention.

For example, in the present embodiment, the invalid region was considered the rectangular region having two specified coordinates as a vertex at the vertical location; however, the invalid region may be set using other methods. For example, a plurality of vertexes may be specified and the region surrounded by these vertexes may be considered the invalid region. Other than this, a circular invalid region may be specified by specifying the vertex and the radius with this vertex as the center. One invalid region was set for each rear touch sensor; however, two or more invalid regions may be set per each rear touch sensor.

The invalid region is specified in the correspondence defining table; however, a valid region may be specified. If it is a method in which the valid region and the invalid region are divided in the rear touch sensors 15 and 25, the valid region or the invalid region may be set in any manner.

The correspondence defining table is changed from the settings by the user; however, for example, the correspondence defining table may be automatically changed in correspondence with the operative condition of the mobile phone 1. For example, it may have a valid region and invalid region configuration that dynamically changes in correspondence with the operative condition of the mobile phone 1.

For example, when the user is touching the first display surface 14 or the second display surface 24, the entire region of the first rear touch sensor and the second rear touch sensor 25 is considered the invalid region. Conversely, when the user is touching the first rear touch sensor 15 and the second rear touch sensor 25, the entire region of the first display surface 14 or the second display surfaces 14 and 24 is considered the invalid region. In this manner, by the CPU 100 timely considering a part of touch inputs as invalid, the frequency of operational errors from a touch not intended by the user may be reduced. The region of the touch sensor exposed outside from the opposite rear side being touched may be considered the invalid region.

Other than this, for example, when an area of touch to the first display surface 14 or the second display surface 24 (hereinafter, referred to as "touch area") exceeds the predetermined threshold value, inputs to the display surface in which the touch was conducted may be considered invalid. In the same manner, when the area of touch to the first rear touch sensor 15 and the second rear touch sensor 25 exceeds the predetermined threshold value, inputs to the rear touch sensor in which the touch was conducted may be considered invalid. That is to say, when the area of touch exceeds the predetermined threshold value, under the assumption that the user is firmly holding the mobile phone 1, the CPU 100 timely considers a part of the touch input as invalid. Thereby, operational errors due to the touch not intended by the user may be reduced.

Changes in the correspondence defining table were conducted by selecting a setting icon; however, it may be conducted by other methods. For example, when an application is in process, an item for conducting correspondence changing processing may be comprised in the various setting menus related to the execution of this application. When this item is selected, the user may change the correspondence defining table associated with the application in process. Thereby, the user may save the trouble of selecting and specifying the application to be the subject in the changing process of the correspondence. If changes to the correspondence defining table are appropriately conducted, this change may be conducted at any timing in addition to the example mentioned above.

In the correspondence defining table, distinction of the closed state (I) and the closed state (II), that is to say, distinction of whether it is horizontal or vertical (Refer to FIG. 5) is not conducted regarding the correspondence to the first or the second display surfaces 14 and 24 in the closed state. However, the established state of the invalid region of the second rear touch sensor 25 in the closed state may differ between the closed state (I) and the closed state (II).

In the present embodiment, different correspondence defining tables were associated with each application. However, the correspondence defining table may be further finely associated with each inputtable screen in the application.

For example, in the e-mail application, a screen to display received e-mails, a screen to display a list of received e-mails, a screen to input the addressee and subject of the e-mails, a screen to prepare and edit the text of the e-mails, and the like, are displayed on the first or second display surfaces 14 and 24. The correspondence defining table may be memorized to the memory 200 in association with such respective screens.

The configuration of the correspondence defining table may be of another configuration if the correspondence is set in correspondence with the condition of use of the mobile phone 1.

In the present embodiment, inputs to the first rear touch sensor or the second rear touch sensor 25 were accepted as inputs to either of the first display surface 14 or the second display surface 24; however, the inputs may be accepted as inputs to both the first display surface 14 and the second display surface 24. In this case, for example, the correspondence defining table of FIG. 25 may be used.

Figure 26A:
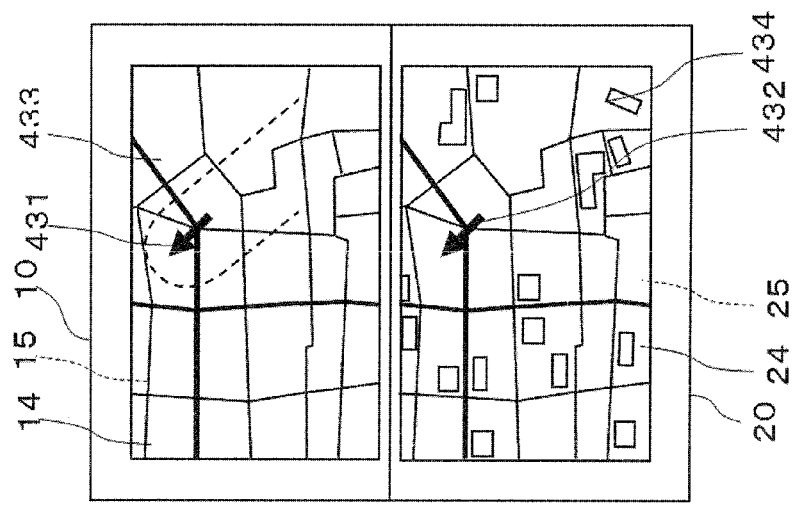
FIGS. 26A and 26B are illustration of diagrams showing a display example of an execution screen of an application in an open state (I) according to an embodiment of the disclosure.

The correspondence defining table of FIG. 25 may be used when a map in the same region is displayed on the first and second display surfaces 14 and 24 in a different manner due to the execution of the application, for viewing maps, as shown in FIG. 26A. A road map 433 is displayed on the first display surface 14, while at the same time, a map 434 of an aerial photography of the same region as the region shown in the road map is displayed on the second display surface 24.

Figure 26B:
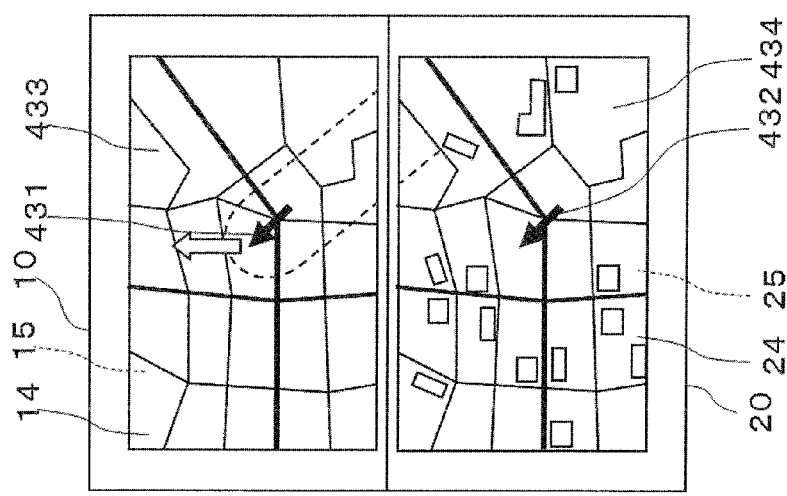

In FIG. 26A, the pointers 431 and 432 are displayed at a location corresponding to the first display surface 14 and the second display surfaces 14 and 24, respectively, based on the touch location to the first rear touch sensor 15. Here, when a finger is slid in the direction of the white arrow, the CPU 100 scrolls the two maps 433 and 434 displayed on the first display surface 14 and the second display surfaces 14 and 24 in correspondence with the sliding operation in the same direction, respectively, at the same distance, as shown in FIG. 26B.

In this manner, the user may use the first and second rear touch sensors 15 and 25 to effectively operate the application that distinctively behaves in the mobile phone 1 with two screens by the correspondence being appropriately changed.

In the present embodiment, the mobile phone 1 comprises two display surfaces and two rear touch sensors; however, the number of display surfaces and rear touch sensors is not limited to two, and may be three or more.

In this document, the terms "computer program product", "computer-readable medium", and the like may be used generally to refer to media such as, for example, memory, storage devices, or storage unit. These and other forms of computer-readable media may be involved in storing one or more instructions for use by the CPU 100 to cause the CPU 100 to perform specified operations. Such instructions, generally referred to as "computer program code" or "program code" (which may be grouped in the form of computer programs or other groupings), when executed, enable a method of using a system such as the mobile phone 1.

Terms and phrases used in this document, and variations hereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile electronic device comprising:
   a first chassis comprising a first front surface and a first rear surface;
   a second chassis comprising a second front surface and a second rear surface;
   a first display surface provided on the first front surface;
   a second display surface provided on the second front surface;
   a first input detector provided on the first rear surface operable to detect touch inputs;
   a second input detector provided on the second rear surface operable to detect the touch inputs;
   a condition detector operable to detect a condition of the mobile electronic device to provide a condition of use;
   a memory operable to store, in association with the condition of use, correspondence relation between the touch inputs detected at the first input detector and the second input detector and the touch inputs to the first display surface and the second display surface; and
   a control module operable to process the touch inputs detected by one of the first input detector and the second input detector as the touch inputs to one of the first display surface and the second display surface based on the correspondence relation in association with the condition of use.

2. The mobile electronic device according to claim 1, wherein:
   the condition of use comprises a position of the first chassis relative to the second chassis, and a direction of the mobile electronic device.

3. The mobile electronic device according to claim 1, wherein:
   the memory is further operable to store the correspondence relation by associating with an application, and
   the control module is further operable to process the touch inputs detected by the first input detector and the second input detector as the touch inputs to the first display surface and the second display surface based on the correspondence relation associated with the condition of use and the application in process.

4. The mobile electronic device according to claim 1, further comprising:
   a correspondence setter operable to receive an operation to change a setting of the correspondence relation, and to cause the memory to store the changed correspondence relation.

5. The mobile electronic device according to claim 1, wherein:
   the memory is further operable to store information in order to regulate an invalid region in which the touch inputs detected by the first input detector and the second input detector are invalid, and
   the control module is operable to prevent processing the touch inputs as the touch inputs to one of the first display surface and the second display surface when the touch inputs detected by one of the first input detector and the second input detector are within the invalid region.

6. The mobile electronic device according to claim 1, further comprising:
   a third input detector operable to detect the touch inputs to the first display surface; and
   a fourth input detector operable to detect the touch inputs to the second display surface, wherein:
   the correspondence relation comprises information to one of validly and invalidly set the touch inputs detected by the third input detector and the fourth input detector in correspondence with the condition of use.

7. The mobile electronic device according to claim 1, wherein:
   the condition of use comprises a closed state in which the first display surface exposes an outer side while the second display surface is covered by the first chassis, and the memory is further operable to store information in order to correspond the touch inputs detected by the second input detector with the touch inputs to the first display surface when the condition of use is the closed state.

8. The mobile electronic device according to claim 1, further comprising:
a supporting section operable to support the first chassis and the second chassis with an open state arranged such that the first display surface and the second display surface are approximately flush, a tilted state arranged such that the first display surface and the second display surface form a predetermined obtuse angle, and a closed state in which the first display surface is exposed to an outer side while the second display surface is covered by the first chassis, and
the condition detector detects at least one of: the open state, the tilted state, and the closed state as the condition of use.

9. The mobile electronic device according to claim 8, wherein:
the memory is further operable to store information to correspond the touch inputs detected by the first input detector with the touch inputs to a first display module, when the condition of use is the tilted state and the mobile electronic device is sideways.

10. The mobile electronic device according to claim 8, wherein:
the memory stores information to correspond the touch inputs to the second input detector with the touch inputs to the first display surface, when the condition of use of the mobile electronic device is the tilted state and when the mobile electronic device is sideways.

11. The mobile electronic device according to claim 8, wherein
the memory is further operable to store information in order to respectively correspond the touch inputs detected by the first input detector and second input detector with the touch inputs to the first display surface and the second display surface, when the condition of use of the mobile electronic device is one of the closed state or the tilted state.

12. The mobile electronic device according to claim 1, wherein:
the memory is further operable to store information to correspond the touch inputs detected from one of the first input detector and the second input detector with touch inputs to both the first display surface and the second display surface, when the condition of use is an open state.

13. The mobile electronic device according to claim 2, wherein:
within a region in which the first input detector and the second input detector detect the touch inputs by a user when the mobile electronic device is longitudinal, the memory is further operable to store information in order to make a predetermined inferior region an invalid region.

14. The mobile electronic device according to claim 1, wherein:
when a touch input is detected by one of the first input detector and the second input detector, the control module is further operable to display a pointer at a position associated with the touch input within a display region of the first display screen and the second display screen.

15. The mobile electronic device according to claim 1, wherein:
the control module is further operable to scroll a screen displayed on the first display surface and the second display surface when an operation of sliding is carried out to one of the first input detector and the second input detector.

16. A method for operating a mobile electronic device comprising:
detecting a condition of the mobile electronic device to provide a condition of use, the mobile electronic device having a first chassis coupled to a second chassis, the first chassis having a first display on a first front surface of the first chassis and a first input detector on a first rear surface of the first chassis, the second chassis having a second display on a second front surface of the second chassis and a second input detector on a second rear surface of the second chassis;
storing in association with the condition of use, correspondence relation between touch inputs detected at the first input detector and the second input detector and the touch inputs to the first display surface and the second display surface; and
processing the touch inputs detected by one of the first input detector and the second input detector as the touch inputs to one of the first display surface and the second display surface based on the correspondence relation in association with the condition of use.

17. A mobile device comprising:
a first chassis comprising:
a first front surface having a first touch display; and
a first back surface having a first touch input detector;
a second chassis movably attached to the first chassis, the second chassis comprising:
a second front surface having a second touch display; and
a second back surface having a second touch input detector;
a condition detector operable to determine relative positions of the first touch input detector and the second touch input detector with respect to the first touch display and the second touch display when the mobile electronic device is in one of the opened condition and the closed condition; and
a control module operable to process inputs detected by either of the first touch input detector and the second touch input detector to control either of the first touch display and the second touch display based on the relative positions determined by the condition detector.

18. The mobile device of claim 17, wherein the second chassis that is movably attached to the first chassis is movable between an opened condition such that the first touch display and the second touch display are approximately flush, a tilted condition such that the first touch display and the second touch display form an obtuse angle, and a closed condition in which the first touch display is exposed as an outer side while the second touch display is covered by the first chassis; and
wherein the relative positions determined by the condition detector are at least one of the opened condition, the tilted condition and the closed condition.

* * * * *